(12) United States Patent
Gerson et al.

(10) Patent No.: US 8,151,199 B2
(45) Date of Patent: Apr. 3, 2012

(54) COMPUTATIONAL DELIVERY SYSTEM FOR AVATAR AND BACKGROUND GAME CONTENT

(75) Inventors: Seth R. Gerson, Pacific Palisades, CA (US); Philip D. Harvey, Santa Monica, CA (US); Susan E. Thayer, Santa Monica, CA (US)

(73) Assignee: AltEgo, LLC, Santa Monica, CA (US)

( * ) Notice: Subject to any disclaimer, the term of this patent is extended or adjusted under 35 U.S.C. 154(b) by 214 days.

(21) Appl. No.: 12/703,055

(22) Filed: Feb. 9, 2010

(65) Prior Publication Data

US 2010/0229108 A1    Sep. 9, 2010

Related U.S. Application Data

(60) Provisional application No. 61/151,022, filed on Feb. 9, 2009.

(51) Int. Cl.
*G06F 3/14* (2006.01)
*G06F 3/17* (2006.01)

(52) U.S. Cl. ............ 715/757; 705/50; 340/524; 463/35; 463/42

(58) Field of Classification Search .......... 715/200–277, 715/700–867; 700/701–866; 709/201–229; 705/50–79; 345/30–111; 348/206–231.9; 707/200–206; 463/35, 42; 340/524
See application file for complete search history.

(56) References Cited

U.S. PATENT DOCUMENTS

| | | | |
|---|---|---|---|
| 6,131,097 A | 10/2000 | Peurach et al. | |
| 6,545,682 B1 | 4/2003 | Ventrella et al. | |
| 7,324,972 B1 | 1/2008 | Oliver et al. | |
| 7,639,251 B2 | 12/2009 | Gu et al. | |
| 2005/0137015 A1 | 6/2005 | Rogers et al. | |
| 2007/0105630 A1 | 5/2007 | Van Luchene | |
| 2007/0111770 A1 | 5/2007 | Van Luchene | |
| 2007/0113181 A1 | 5/2007 | Blattner et al. | |

(Continued)

FOREIGN PATENT DOCUMENTS

EP    1528464    5/2005

(Continued)

OTHER PUBLICATIONS

"Bigworld" bigword.com http://www.bigworldtech.com/index/index.php, accessed Jun. 2010.

(Continued)

*Primary Examiner* — Ruay Ho
(74) *Attorney, Agent, or Firm* — Greenberg Traurig, LLP; David J. Dykeman; Wayne V. Harper

(57) ABSTRACT

Data defining an avatar is received over a network. A sprite sheet comprising a plurality of sprites is created, using the data defining the avatar. Each sprite includes a partial rendering of the respective avatar and at least one run-time parameter including a sprite attribute. A plurality of requests are received, over the network, for the avatar from a plurality of user applications. The data defining the avatar and the sprite sheet are transmitted, over the network, to each of the requesting user applications, enabling each respective user application to display the sprites in the sprite sheet and to set the run-time parameter associated with each of the sprites in the sprite sheet such that each respective sprite is thereby customized to the application.

18 Claims, 15 Drawing Sheets

U.S. PATENT DOCUMENTS

| | | | |
|---|---|---|---|
| 2007/0155494 A1* | 7/2007 | Wells et al. | 463/35 |
| 2008/0120558 A1 | 5/2008 | Nathan et al. | |
| 2008/0191864 A1* | 8/2008 | Wolfson | 340/524 |
| 2008/0220876 A1 | 9/2008 | Mehta et al. | |
| 2008/0282090 A1 | 11/2008 | Leybovich | |
| 2009/0055754 A1 | 2/2009 | Finn et al. | |
| 2009/0112906 A1 | 4/2009 | Shuster | |
| 2009/0113314 A1 | 4/2009 | Dawson et al. | |
| 2009/0138355 A1 | 5/2009 | Jung et al. | |
| 2009/0193343 A1 | 7/2009 | Jones et al. | |
| 2009/0253517 A1 | 10/2009 | Bererton et al. | |
| 2009/0254486 A1 | 10/2009 | Hutchison et al. | |
| 2009/0254843 A1* | 10/2009 | Van Wie et al. | 715/757 |
| 2009/0259948 A1 | 10/2009 | Hamilton, II et al. | |
| 2009/0285483 A1 | 11/2009 | Guven et al. | |
| 2009/0293056 A1 | 11/2009 | Ferris | |
| 2009/0300210 A1 | 12/2009 | Ferris | |
| 2009/0300607 A1 | 12/2009 | Ferris et al. | |
| 2009/0307620 A1 | 12/2009 | Hamilton, II et al. | |
| 2009/0319609 A1 | 12/2009 | Ferraro | |
| 2010/0005028 A1* | 1/2010 | Hartley et al. | 705/50 |
| 2010/0005423 A1 | 1/2010 | Finn et al. | |
| 2010/0060649 A1 | 3/2010 | Haggar et al. | |
| 2010/0285884 A1* | 11/2010 | Gauer et al. | 463/42 |

FOREIGN PATENT DOCUMENTS

| | | |
|---|---|---|
| KR | 20040030016 | 8/2004 |
| WO | WO 2007/093813 | 8/2007 |
| WO | WO 2008/065440 | 6/2008 |
| WO | WO 2009/000028 | 12/2008 |
| WO | WO 2010/028064 | 3/2010 |

OTHER PUBLICATIONS

"Blue Mars" bluemars.com http://www.bluemars.com/about/faq_general.html, accessed Jun. 2010.

Bridges, Corey et al., "Multiverse" Multiverse Network, multiverse.net http://www.multiverse.net/platform/technology, Game Developers Conference, Feb. 18, 2008.

Feldman, Michael "NVIDIA Pitches GPU Computing in the Cloud" *HPC Wire*, http://www.hpcwire.com/features/NVIDIA-Pitches-GPU-Computing-in-the-Cloud-65217572.html, Oct. 21, 2009.

Gakai.com http://www.gaikai.com/streaming-worlds/, accessed Jun. 8, 2010.

Hamrick, M. "VWRAP: Introduction and Goals" IETF Virtual World Region Agent Protocol draft-hamrickvwrap-intro-01 http://tools.ietf.org/wg/vwrap/, May 18, 2010.

"Meez" meez.com http://www.meez.com/, Jun. 7, 2010.

Radoff, Jon "Anatomy of an MMORPG", http://radoff.com/blog/2008/08/22/anatomy-of-an-mmorpg/, Aug. 22, 2008.

"Ryzom Core" http://dev.ryzom.com/wiki/ryzom/ServiceArchitecture, accessed Jun. 2010.

Watte, J. "Use Cases to Guide Chartering MMOX Interoperability Work", Network Working Group, Intended status: Informational, draft-jwatte-mmox-use-cases-00 http://tools.ietf.org/pdf/draft-jwatte-mmox-use-cases-00.pdf, Mar. 4, 2009.

"WeeWorld" weeworld.com http://ww.weeworld.com/, Jun. 4, 2010.

Wolf, Heiner, "Virtual Presence Identity" Internet Engineering Task Force, draft-wolf-vp-identity-00 http://tools.ietf.org/pdf/draft-wolf-vp-identity-00.pdf, Mar. 2009.

* cited by examiner

| sprites | imageWidth | imageHeight | columns | rows | spriteWidth | spriteHeight | rightPad | topPad |
|---|---|---|---|---|---|---|---|---|
| 1 | 128 | 128 | 1 | 1 | 128 | 128 | 0 | 0 |
| 4 | 128 | 128 | 2 | 2 | 64 | 64 | 0 | 0 |
| 8 | 128 | 128 | 4 | 2 | 32 | 64 | 0 | 0 |
| 9 | 128 | 128 | 3 | 3 | 42 | 42 | 2 | 2 |
| 4 | 256 | 128 | 4 | 1 | 64 | 128 | 0 | 0 |
| 5 | 256 | 128 | 5 | 1 | 51 | 128 | 1 | 0 |
| 9 | 256 | 128 | 4 | 2 | 64 | 64 | 0 | 0 |
| 12 | 256 | 128 | 6 | 2 | 42 | 64 | 4 | 0 |
| 12 | 512 | 128 | 12 | 1 | 42 | 128 | 8 | 0 |
| 12 | 128 | 512 | 1 | 12 | 128 | 42 | 0 | 8 |
| 100 | 4096 | 512 | 34 | 3 | 120 | 170 | 16 | 2 |

FIG. 10

XML Sprite Sheet Format

If 9 sprites are arranged as a 3x3 square on a spritesheet then they will be placed as follows:

```
pad  pad  pad  pad
 1    2    3   pad
 4    5    6   pad
 7    8    9   pad
```

The sprite in position 7 is aligned with the lower left corner of the spritesheet. Each sprite has exactly the same size, and a modulo padding is left over on the top and right edges of the spritesheet.

Here is pseudo code that determines the number of rows and columns as well as the size of each sprite:

```
spriteGridLayout ( int spriteCount, outerPixelWidth, int outerPixelHeight )
{
    assert( outerPixelWidth > 0 66 outerPixelHeight > 0 66 spriteCount > 0 ) ;
    float fullPixelArea = (float) outerPixelWidth * outerPixelHeight;
    float desiredAreaPerSprite = fullPixelArea / spriteCount;
    int optimalEdgeSize = (int) sqrt ( desiredAreaPerSprite );
    if ( outerPixelWidth >= outerPixelHeight )
    {
        result.rows = std: : max (1, outerPixelHeight / optimalEdgeSize);
        result.columns = ( spriteCount + result.rows - 1 ) / result.rows;
    }
    else
    {
        result.columns = std::max(1, outerPixelWidth / optimalEdgeSize);
        result.rows = ( spriteCount + result.columns - 1 ) / result.columns;
    }
    result.spriteWidth = outerPixelWidth / result.columns;
    result.spriteHeight = outerPixelHeight / result.rows;
    return result;
}
```

FIG. 11

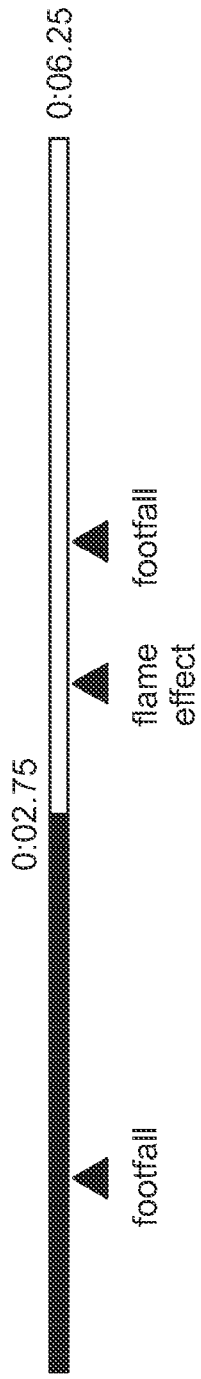

COMPUTATIONAL DELIVERY SYSTEM FOR AVATAR AND BACKGROUND GAME CONTENT

This application claims the benefit of U.S. Provisional Patent Application No. 61/151,032 filed Feb. 9, 2009 entitled "Cloud Computing For Massively Multiplayer Online Games", the entirety of which is hereby incorporated by reference in its entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for online, single player and multiplayer games, consumer electronics products, and more particularly, to systems and methods for delivering content (such as avatars, background objects, props, and meta data for both objects and backgrounds) within and between online games.

BACKGROUND OF THE INVENTION

An online game is a video game that is capable of supporting almost unlimited numbers of people. Online games are typically played over the Internet, and feature at least one persistent world and main character. Players can cooperate and compete with each other on a large scale, and sometimes, interact meaningfully with people around the world. Such games include a variety of gameplay types, representing many video game genres.

The market for online games is already large, and it is growing. Currently, Over 16 million users pay monthly subscription fees for online games. The market is expected to grow 5% annually on subscription fees games and the non subscription fee market is growing even faster. Videogames, in general, are realizing revenue growth despite the current economic climate.

One of the most important components of online games, as well as other online communities, are avatars that represent the user in such communities. Within the context of a specific game, avatars gain experience, hone skills, and acquire various types of digital goods. Online gamers, however, often play many different online games, and gamers' avatars and the digital goods associated with the avatars may not be portable across multiple environments.

SUMMARY OF THE INVENTION

A computational delivery system and methods for avatar and background game content are disclosed herein.

In an embodiment, the invention is a method. Data defining an avatar is received, over a network. The data defining the avatar is stored to a computer readable medium. A sprite sheet comprising a plurality of sprites is created, using at least one computing device, using the data defining the avatar. Each sprite comprises a partial rendering of the respective avatar and at least one run-time parameter comprising a sprite attribute. A plurality of requests are received, over the network, for the avatar from a plurality of user applications. The data defining the avatar and the sprite sheet are transmitted, over the network, to each of the requesting games, whereby each respective user application is enabled to display the sprites in the sprite sheet. The user application is further enabled to set the run-time parameter associated with each of the sprites in the sprite sheet such that each respective sprite is thereby customized to the application.

Data relating to an activity experienced by an avatar in a first user application is received, over a network. The data comprises an avatar identifier, a first activity name and a first activity experience value. At least one first activity term is extracted from the first activity name. An entry in a multidimensional vector space is created. Each of the activity terms is used to set a value of at least one dimension of the multidimensional vector space. The first activity experience value is used to set an experience value of the entry. A request for avatar experience relating to the activity is received over a network from a second user application. The request comprises the avatar identifier and a second activity name, wherein the second activity name is equivalent in meaning to the first activity name. At least one second activity term is extracted from the second activity name. The entry in the multidimensional vector space is locating, using the at least one computing device, Each of the second activity terms is used to set a value of the dimension of the multidimensional vector space The entry is located and the experience value of the entry is sent to the second user game.

In an embodiment, a method includes receiving, over a network, data defining an avatar, wherein data defining the avatar is stored to a computer readable medium; creating, using at least one computing device, using the data defining the avatar, a sprite sheet comprising a plurality of sprites, wherein each sprite comprises a partial rendering of the respective avatar and at least one run-time parameter comprising a sprite attribute; receiving, over the network, a plurality of requests for the avatar from a plurality of user applications; and transmitting, over the network, the data defining the avatar and the sprite sheet to each of the requesting games, whereby each respective user application is enabled to display the sprites in the sprite sheet, and wherein the user application is further enabled to set the at least one run-time parameter associated with each of the sprites in the sprite sheet such that each respective sprite is thereby customized to the application.

In an embodiment, a method includes receiving, over a network, from a first user application, data relating to an activity experienced by an avatar in a first user application, wherein the data comprises an avatar identifier, a first activity name and a first activity experience value; extracting, using at least one computing device, at least one first activity term from the first activity name; creating, using at least one computing device, an entry in a multidimensional vector space, wherein each of the at least one first activity terms is used to set a value of at least one dimension of the multidimensional vector space, and first activity experience value is used to set an experience value of the entry; receiving, over a network, from a second user application, a request for avatar experience relating to the activity, wherein the request comprises the avatar identifier and a second activity name, wherein the second activity name is equivalent in meaning to the first activity name; extracting, using at least one computing device, at least one second activity term from the second activity name; locating, using the at least one computing device, the entry in the multidimensional vector space, wherein each of the at least one second activity terms is used to set a value of at least one dimension of the multidimensional vector space, whereby the entry is located; and sending, over the network, to the second user game, the experience value of the entry.

In an embodiment, a method includes receiving, over a network, data from an application relating to a player's experience, wherein the data relating to the player's experience comprises a plurality of phrases in a natural language expression; converting, using a computing device, the plurality of natural language expressions, into a plurality of multidimensional vectors; combining, using the computing device, the plurality of multidimensional vectors such that natural language expressions of related content have a high likelihood of related direction in a multidimensional space defined by the plurality of multidimensional vectors; and storing representations of the data relating to a player's experience in the multidimensional vector space.

In an embodiment, a system includes a first module comprising one or more processors programmed to execute software code retrieved from a computer readable storage medium storing software for receiving, over a network, data defining an avatar, wherein data defining the avatar is stored to a computer readable medium; a second module comprising one or more processors programmed to execute software code retrieved from a computer readable storage medium storing software for creating, using at least one computing device, using the data defining the avatar, a sprite sheet comprising a plurality of sprites, wherein each sprite comprises a partial rendering of the respective avatar and at least one run-time parameter comprising a sprite attribute; a third module comprising one or more processors programmed to execute software code retrieved from a computer readable storage medium storing software for receiving, via the network, a plurality of requests for the avatar from a plurality of user games; a fourth module comprising one or more processors programmed to execute software code retrieved from a computer readable storage medium storing software for transmitting, over the network, the data defining the avatar and the sprite sheet to each of the requesting games, whereby each respective user application is enabled to display the sprites in the sprite sheet, and wherein the user application is further enabled to set at least one run-time parameter associated with each of the sprites in the sprite sheet such that each respective sprite is thereby customized to the game; and a fifth module comprising one or more processors programmed to execute software code retrieved from a computer readable storage medium storing software for transmitting, over the network, 3D meshes and assets associated with the 3D meshes.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

FIG. 10, illustrates a rendered sprite sheet which can be transported to the client for finale rendering in on a client device on demand.

FIG. 11 illustrates an embodiment of an algorithm for rendering such a sprite sheet on a cloud-based server.

FIG. 14 illustrates one example of a partial render.

FIG. 15 illustrates an embodiment of a visual timeline that the editor could provide.

DETAILED DESCRIPTION

Figure 1:
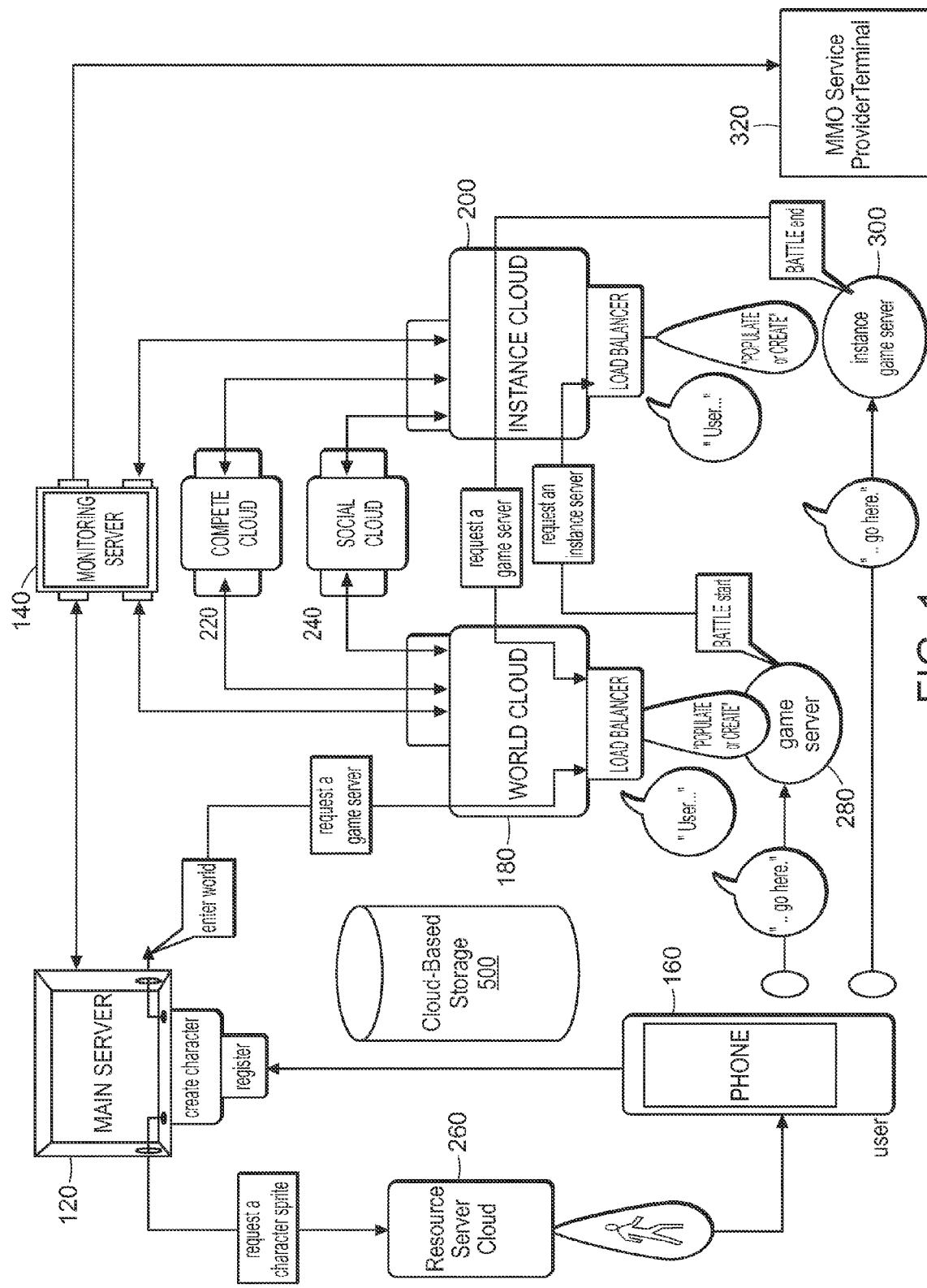
FIG. 1 illustrates an embodiment of a system for implementing MMO games on a cloud computing platform.
Figure 2:
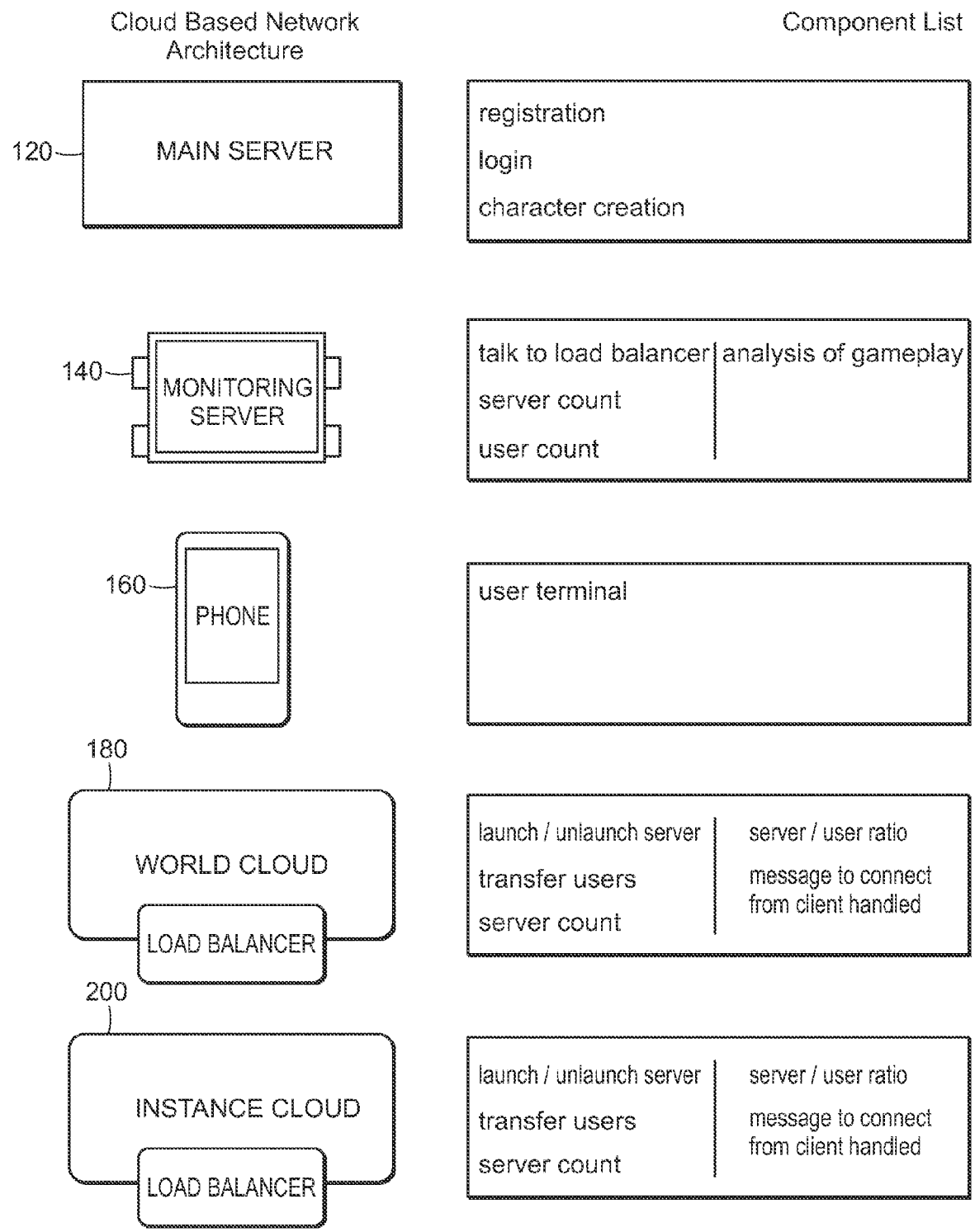
FIG. 2 illustrate the components of the system is shown in FIG. 1 in more detail.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

For the purposes of this disclosure the term "end user" or "user" should be understood to refer to a consumer of data supplied by a data provider or services provided by a service provider. By way of example, and not limitation, the term "end user" can refer to a person who receives data provided by a data provider over the Internet in a browser session, or can refer to an automated software application which receives the data and stores or processes the data. By way of example, and not limitation, the term "end user", bot or NPC can additionally or alternatively refer to a person who uses a service provided by a service provider over the Internet in a browser session, such as, for example, a recommendation system.

The present disclosure is directed to various embodiments of systems and methods for delivering content (such as avatars, background objects, props, and meta data for both objects and backgrounds) within and between online single user and multi user applications, such as games or simulations.

An avatar is a computer user's representation of himself/herself within computer games or other computer generated environments. Avatars can take the form of a two or three-dimensional model that may, or may not, be animated. Within a computer game, an avatar represents a user and is the principle vehicle in many games for the user to enter an alternative reality created by the game. Within a given game, avatars gain experience by participating in the game, earn or find currency, and gather or purchase objects for the avatar's use, such as clothing or weapons, as game play dictates. Users can become very attached to their avatars, sometimes coming to regard such avatars as their alter ego in the online world.

A user may play many games over the course of time, but typically, a player's avatar created in one game cannot be used in other games, particularly those games created by different developers. Even to the extent that aspects of avatars can be ported between games, such as the avatar's physical appearance, it is often the case that the experience the avatar has earned in one game or objects the avatar has acquired, cannot be ported with the avatar.

Moreover, avatars, particularly those defined with complex animation, may not be supported by one or more devices a user wishes to use to play games or participate in other online environments. This may be due, at least in part, to the fact the device simply cannot handle complex animations.

The present system and method provides an Online experience that supports portable avatars that can be used in multiple games within the Online experience. In various embodiments, the experience the avatar gains in any given game can be ported to other games within the Online experience, and object acquired by the avatar in any given game, or in an online store that functions external to any game, can be ported to other games in within the environment.

The present system and method provides an Online experience that supports portable avatars on multiple devices. In various embodiments, an avatar and its animations can be fully, or partially rendered, prior to game run-time by servers within the Online experience. Additionally, real-time rendering could be offloaded from client devices to servers within the Online experience.

Note that elements of such an Online experience could also be used to create other types of portable objects within a environment that fill out background content. Such portable objects could include, without limitation, backgrounds, environmental objects (e.g., trees and bushes), and non-player characters (NPCs), and bots.

System Overview

FIGS. 1-4 illustrate various elements of an embodiment of a system that implements an Online experience capable of supporting online games featuring avatars and background content that is portable across multiple games within the environment. The system shown in FIGS. 1-4 is implemented using, at least in part, resources hosted within a commercial cloud computing environment such as, for example, Amazon Web Services, Yahoo!'s cloud, Google's cloud, Microsoft's cloud, and others. Cloud computing is well suited for hosting elements of an Online experience, since at any given time, at least in theory, any number of players, in any number of locations may wish to play in any number of different games hosted by the system.

The Online experience shown in FIGS. 1-4 automatically scales processing available to online games by, among other things, automatically starting and stopping virtual servers within a commercial cloud and automatically offloading various types of processing (such as rendering) from client devices to servers within a commercial cloud computing environment. The components of system can be adapted to run on various platforms such as Microsoft Azure and Linux. The system can be implemented using standard, commercially available development tools. For example, the system could be written in C. Databases could be constructed using a SQL-based database systems.

It is understood, however, that while a cloud-based implementation of the disclosed Online experience has specific advantages as discussed below, that many of the inventive elements of the systems and methods described herein could be implemented in an Online experience comprising one or more networked servers and storage devices in various combinations, as will be readily apparent to those skilled in the art.

In an embodiment, a service provider maintains at least one main server 120, which can be hosted at the service provider's site, or can be cloud-based. The main server serves as a control point for operation of the system. The main server 120 provides facilities for users of the system to, inter alia, register with the system, login to the online environment, maintain one or more accounts and create avatars. The main server 120 may represent a single physical server or cluster of servers which provide all of the functions described above. Alternatively, the main server 120 may represent a group of real or virtual servers, each providing separate functions. For example, in an embodiment, an avatar server could provide avatar creation and maintenance services.

Registered users initially login to the main server 120, which accesses their Player Gaming Profile (PGP) using a user terminal 160. The user terminal can be any graphics capable network connected device such as a PDA, a consumer electronics device, a camera, a cell phone such as Apple Computer's iPhone, a PC, a laptop or a game console. After login, if the user chooses to enter an online world, the main server directs the user terminal to connect to game server 280 within the world cloud. User data, such as, for example, user profile data and user social network data (e.g., friends and contacts) can be stored on one or more storage resources 500 that are hosted by the service provider (e.g., directly connected to a main server 120 at a service provider site) or that are hosted on a cloud computing storage resource accessible to the other components of the system. Centralized storage of user data enables any environment hosted on the Online experience to access user data, facilitating, among other things, the migration of the user from one situation to another.

The main server 120 initiates the online environment by requesting game servers 280 within a world cloud 180 implemented on a commercial cloud platform. The world cloud 180 is configured to be able to, inter alia, launch or shutdown game servers 280 based on demand, maintain server counts, populate or create worlds on the game servers, and transfer users between application servers. In an embodiment, servers are initiated and terminated by running initiate and terminate server modules respectively that can create worlds (application servers), chat servers, or instance servers (discussed below.) Different regions, worlds, instances, and chats can essentially mirror each other, allowing users to easily migrate through the worlds or intra-world.

The game servers 280 can provide game state functions that allow users to save all items, achievements, in-game data, instance data, and any other ID's, players, characters, as well as data from other games in one or more databases hosted on cloud-based storage resources 500. The system can include a highly robust and modular user statistics database that allows all statistics to be stored for each user. In an embodiment, game analysis functions (discussed below) can generate additional statistics that can be stored on the user statistics database. The game database can maintain data for all system components necessary for loading individual games, including player statistics, world stats, in some cases world logic, messages, and so forth. The avatar and associated items, companions, clothing, experience can also be stored separately on cloud-based storage resources 500. Centralized storage of avatar and game data enables any game hosted on the Online experience to access such data, facilitating, among other things, porting avatars and background game content between games.

Such data can include virtual possessions, achievements, currency, appearance, friends, communications, items, multi dimensional experience, and any other parameters pertaining to a user. All positional data can be saved for users as they move from region to region, region to instance, and in and out of the game. The system can include an awards system that stores maintains, and keeps attributes of awards, such objects or skills given to players that provide intrinsic value in the world. In an embodiment, awards can be used, traded, or stored.

In at least an embodiment, the system provides a set of developer tools that enable developers to build and implement games. Such tools could include an editor that enables developers to create and/or modify avatars and various types of game content. Such tools could also include APIs and/or SDKs that enable developers to bundle components of the system described as a thin software layer that is optionally statically linked, dynamically linked, compiled, or interpreted en masse by game software. Various embodiments of such developer tools are described in detail below.

The system can provide a flexible set of standardized functionality for custom utilization by each game. The system can be implemented such that a given game may choose to use a limited number of components of the system, such as, for example, the avatar login service. On the other extreme, a game might utilize multiple cloud-based services provided by the system such as, for example, dynamically changing backgrounds, automated cloud based image load balancing, avatar customization and delivery, avatar state sharing, avatar experience saving, inventory management, transactional abilities, sub minimum transaction execution, and digital currency systems.

The system can provide server-side game functions that enable partial or total game instructions to be delivered to and from game servers 280. These functions enable world and game rules, as well as object definitions, variables, storage and so forth, to be implemented in the cloud layer, include the implementation of both artificial intelligence, as well as physics, dynamic camera routines, and other world inputs from external data sources. In an embodiment, these functions enable programmers to deliver game, world, character constraints from a macro level, and can include usage of scripting language for ease of use.

In an embodiment, server-side artificial intelligence (AI) modules or functions can be stored in an AI library. Multiple forms of AI can be used in the world cloud 180. In an embodiment, AI is computed at the cloud level 180, and either given to bots or NPC's which can live persistently at the cloud level or transferred to the client 160. In an embodiment, where the client 160 receives AI functions, results are always transferred back to the cloud level 180. The system can be configured such that users can surrender control of characters, and put them on AI autopilot. Multiple AI sets can be used, and in some cases, third-party AI algorithms, modules or functions are used and incorporated into the main AI system. This AI can be combined with an avatar's experience, or given to the avatar separately.

In an embodiment, server side physics modules or functions can be stored in a physics library. Physics for individual world objects can be calculated at the cloud level and transported to the client 160. This can also be scripted. In other cases, partial physics can be processed at the client level 160, and either delivered to the cloud 180 or completed by the cloud and transferred back to the client device. Macro-level physics functions can be configured to work in the same manner. Multiple physics sets can be used, and in some cases third-party physics algorithms are used and incorporated into the main physics system. In addition this physics can be applied to avatars in the form of inverse kinematics. In all cases, the computational load is reduced by sharing redundant computations among the clients, and optimized so that clients that can handle heavier loads are given additional work.

Implementing cloud based AI and Physics can allow for greater CPU driven AI, persistent universes, and more realistic physics. Leveraging the cloud systems can enable faster computation of complex processes involved in virtual environments. Such modules can tie into logic modules enabling developers to set various rules for characters, environments, and objects allowing them to effectively make world rules that enable enhanced experiences. This gives developers a higher level of simulation. In an embodiment, all this can be done through a scripting language that can give developers a cloud based server application that uses scripting to run logic simulations.

In an embodiment server-side functions can additionally include business logic modules or functions which can be stored in a business logic library. Business logic modules can include functions by which real and virtual currency is stored and managed. Inputs for credit and debit systems can be stored cloud-side. Business logic modules can allow for the monetization in multiple ways of the gaming experience, whether through virtual goods, subscription, advertising, etc., while the game administration allows for the monitoring of the broader scope of software operations. The business logic can tie into the game currency allowing users to purchase, exchange goods, services, credits, digital real estate, and other items from either the game developer, the game publisher, or world users. In addition, values can be maintained server-side with redundancy for virtual currency so that items, characters, worlds, objects, etc. can be imported into any individual world or web page, and then transactions or trades can occur with any macro level rules such as transaction fees, if applicable. In an embodiment, gambling systems can be supported. Various embodiments of currency systems that could be implemented by the system are described in more detail below.

In an embodiment, the Online experience can support virtual enterprises that enable users, through their respective avatars, to buy and sell digital currency and buy and sell various types of digital goods. In an embodiment, such virtual enterprises exist outside of the context of specific games, but can be seamlessly entered from within a game, or alternatively or additionally may entered from an separate interface provided by a server within the Online experience (e.g., a stand alone web store). Various aspects of the operation of such enterprises is discussed in more detail below with respect to currency systems.

In an embodiment, the system is monetized, at least in part, through the sale of digital currency and/or digital goods. In such a model, developers develop and implement applications and game content (such as avatars, and avatar-usable objects) on the Online experience free of charge to prospective users. Users of such applications and game content will likely ultimately purchase various types of digital currency and digital goods using real money. The revenues derived from such sales is then divided between the Online experience provider and developers.

In an embodiment, the system can provide server-side functions can include cloud switching functions that allow game developers to automatically or manually switch between commercial clouds so as to always achieve the lowest total price. Developers can manually choose parameters for cloud switching, or allow the system to automatically conduct switching. Automatic switching can be configured to occur based on a calculation of current users and individually associated processing, storage and bandwidth costs. User growth and time are also calculated in this function. In some cases processing, storage, and bandwidth can be split between different cloud providers to retain the lowest level of costs and economies of scope and scale.

The world cloud 180 can include a load balancing function to insure that the load on individual game servers is evenly distributed. The load balancing function can automatically monitor server loads. Depending on the specific application, a specific number of servers can support a specific numbers of users. This may be applicable for all server usage: instances, chat, regions, worlds, etc. There is also an approximate time it takes to initiate a new server. When the number of users nears the maximum capacity of a server, new servers can be initiated. Users are added to that server until the total number of users allowed on that server is approached, but not yet reached. Some allowance is made if there are groups of users that are essentially "tethered or snap to" each other. Previously initiated servers with low usage can be shut down. If the server load goes below the minimum threshold, then users are either aggregated to other "in use" servers, or when the number of players hits 0, then the server is terminated. In some cases, servers with a low number of users begin to be allocated new users as they send requests.

Events may occur where users participate in connected operations where a number of users participate in a similar set of logic. Such operations can include fighting, communication, joint puzzle solving, or any number of these and other game play or non-game elements in combination. In such event, the game server 280 that is supporting the user's session can request an instance server 300 from an instance cloud 200 to support such operations. The instance cloud 200 is configured to be able to, inter alia, launch or shutdown instance servers 300 based on demand, maintain server counts, and transfer users between instance servers.

Instances performed on instance servers 300 can be instantiated to perform the smallest to largest initiation of singular or multiplayer performed application logic. Instances can use server-side functions, AI functions and business logic functions discussed above to support usability on the instances. Processing is divided between server-side processing and processing on user terminal 160 such that computation components are utilized in a manner that improves the user's experience by either more efficiently using the available resources or minimizing the inherent latency of multiplayer games.

In an embodiment, when a game server 280 requests an instance server on behalf of a user, the instance cloud returns a reference to an instance server 300. The user terminal 160 is then directed to the appropriate instance server 300. When the event supported by the instance server 300 completes (e.g., a battle concludes) the instance server 300 requests an application server 280 from the world cloud 200 and directs the user back to the selected server. The system can be configured to take users out of one world and place them in another. Data can be stored about where the user entered the instance, and when the instance terminates, the user is returned in the same state, allowing for any change in the game state as a result of events occurring on the instance.

In an embodiment, the system can provide a challenge system whereby, one or more users can initiate an instance with one or more other users. The system finds all relevant player devices, stores the pre-instance real world and/or online locations for all users, initiates communication, and retrieves the correct challenge parameters such as avatar abilities, avatar attributes, world information, and in some cases, game logic. At the end of the challenge, users are restored to their pre-instance locations, unless otherwise specified as a result of the instance.

The world cloud 180 and the instance cloud 200 can additionally be connected to a social cloud 240. The social cloud can tap into any information available on the web relating to users of the system including, without limitation, web pages created by or relating to users, blogs created by or relating to users and social networking websites. In an embodiment, the system can provide hooks that allow applications to be tied into social graphs such as those available on the social networking websites Facebook, Flickr or Myspace. Users can be given the ability to start their own player profiles that can be moved from one application to another. Users can additionally be given the ability to transfer data, multimedia, and other info or objects to web pages or clients allowing users to automatically post this data to web pages, social graphs, other clients or programs. User terminals 160 may also be connected to social cloud 240 through additional conduits, such as a connection to social cloud 240 via resource server cloud 260. In an embodiment, friends can be represented as bidirectional links between individual avatars within the context of specific games. An embodiment of such friend relationships is described in more detail below.

In an embodiment, the social cloud 240 can provide virtual regional chat servers. Chat servers can be configured so as to allow players to communicate at the cloud level to each other in instances and worlds. Users generate messages to friends via in client-side in-game communication protocols including, text, email, virtual regional world posts voice and video/teleconference. Chat can occur either 1-to1, 1-to-many, or on a world level. Chat servers can be on a total or world level. The system can allow users to email friends at the cloud level. Such communications can be stored and executed server-side, providing an additional level of security against undesired or malicious user access. The system can provide user profiles that can include user data and personal information that can be displayed via clients, social graphs, or proprietary social graphs.

The world cloud 180 and the instance cloud 200 can additionally be connected to a compete cloud 220. The compete cloud 220 can include competition functions or modules that allow user (client side) participation to be tracked for competitive purposes. Such functions may include game competition ladders and leaderboards. The compete cloud 220 can additionally provide foe wagering of digital or real world goods and currency and the ability to win digital or real world prizes.

In an embodiment, the operation of the system can be monitored by one or more monitoring servers 140 which may be separately located on different computers or may physically share the same compute devices as other servers. The monitoring server 140 can, inter alia, be in communication with the load balancers of the world cloud 280 and the instance cloud 300, maintain user and server counts and provide analysis of game play. The monitoring servers 140 can additionally provide one or more service provider terminals 320 that allow the service provider to access monitoring statistics. Since the system is cloud based, any module such as monitoring servers can be on the same hardware as other modules.

The system can provide administration modules which may be implemented on monitoring servers 140. In an embodiment, administration modules can provide multilayered visibility for cloud based and client side operations. Terminals 320 can introspectively examine the entire system and see macro level status such as number of servers, bandwidth, storage, load balancing, server initiation and termination in real time, as well as have data transported through databases so that it is possible to see active clients, client usage, individual player stats, social graph integration, etc. In some embodiments, every module is trackable and analytics are performed for statistical derivatives. The system can also provide value for game masters or administrators who have the ability to terminate client usage for system misuse.

The system can additionally provide a resource server cloud 260 implemented on a commercial cloud platform. The resource server cloud 260 offloads some of the task of generating sounds and images presented on user terminal 160 by pre-processing and partially or fully rendering game resources including, inter alia, 3D geometry, textures, shaders, animations, sprites, sounds, and music, reformatted from original data to service the specialized needs of user terminal 160. Various techniques that the Online experience can use for rendering are discussed in more detail below.

Figure 4:
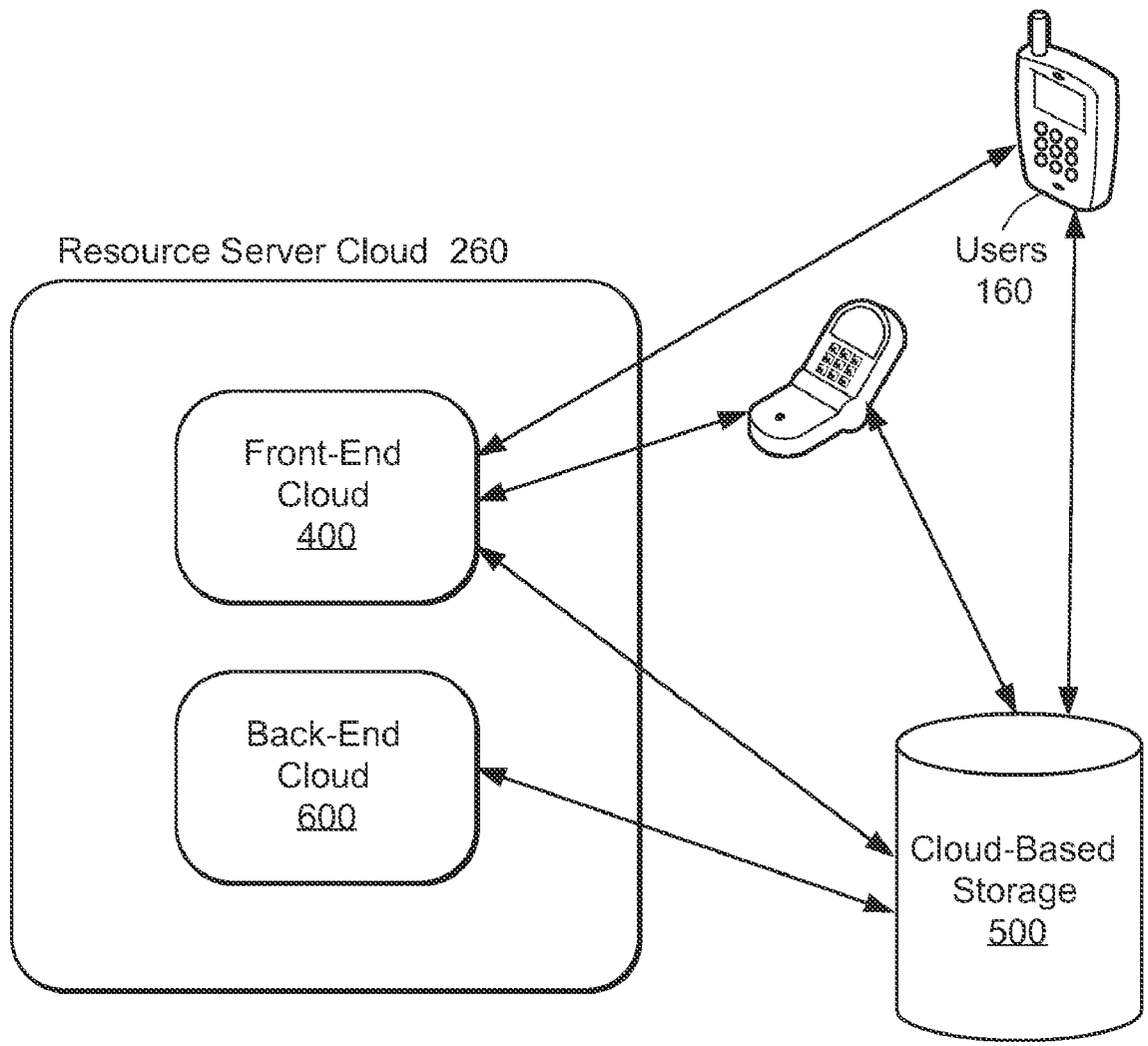
FIG. 4 illustrates the components of an embodiment of a resource server cloud.

FIG. 4 illustrates the components of an embodiment of a resource server cloud. The user terminal 160 requests game resources through resource server cloud 260 by directing the request to a front end cloud 400. If the requested resource is available in resource storage 500 in the format specialized to user terminal 160 at the time when the request is received by front end cloud 400 then the front end cloud 400 responds to user terminal 160 with the name of the requested resource within resource storage 500. User terminal 160 may then retrieve the resource from resource storage 500 using the name supplied by front end cloud 400. Otherwise, if the resource requested by user terminal 160 cannot be immediately supplied by resource storage 500 at the time that the request is received by front end cloud 400 then the front end cloud responds to user terminal 160 with a name for the resource yet to be generated, and optionally a promised delivery time, and front end cloud 400 also messages the back end cloud 600 with the requested resource name along with the specifics of the resource request.

The back end cloud 600 generates the requested resource which is then stored in the named location within resource storage 500 and thereafter may be retrieved by user terminal 160. This described division of resource server cloud 260 into front end cloud 400 and back end cloud 600 introduces resource storage 500 such that the configuration and number of servers within the cloud may grow in a manner responsive to the separate demands of total resource requests received by front end cloud 400 and unique resource requests received by back end cloud 600.

In an embodiment, a device profile is kept by the front end cloud 400 that specifies what processing should be performed by the resource server cloud and what processing should be performed by client. The front end cloud can use this profile to divide rendering tasks. The front end could 400 responds to a client render request with a description of the partially rendered results and forwards a partial render request to the resource server cloud in order to produce those results. Some parts of partial rendering may be cached before the request is received and as a byproduct of similar or identical prior requests. Similarly, the client may also cache partially rendered results for reuse in subsequent imagery.

The resource server cloud 260 is comprised of at least one server computer as well as zero or more storage units and other computers. The resource server cloud grows and shrinks the actual number of servers and storage units that are in current use through automatic anticipatory heuristics to meet real time demands where the heuristics measures and limitations are controlled by the system monitor 320. Resources that are rarely requested may be removed from storage so that they will be re-generated when next requested and thus reduce unnecessary storage space, potentially reducing the number of cloud storage units. Resources may be physically relocated onto storage units that more efficiently meet the world location needs of user terminals 160 thus improving the efficiency by which resources may be served. Servers within the resource server cloud 260 automatically start and stop in order to balance the needs of resource serving requests, anticipated requests, computational requirements, and numbers and locations of requesting user terminals 160.

In an embodiment, the resource server cloud 260 operates independently of the world cloud 180 and the instance cloud 200. Images, animations, and other resources can be generated by resource server cloud 260 and are then sent to user terminals 160. Such resources provide for the partial computation of images and sounds presented by user terminals 160 for the purpose of augmenting the processing capability of user terminals 160 as well as providing data to user terminals 160 in a manner efficient for presentation. Cloud rendered images can be used for architecture, individual objects, whole worlds, backdrops, characters, or animations. The resource server cloud 260 can additionally be configured to support a particle system that renders particles and sends them realtime for additional layered special effects on user devices.

In an embodiment, the resource server cloud 260 is configured to enable users to make interactive changes to characters, objects, and environments. These modifications are then transported from the resource server cloud 260 to end user terminals 160. The system then populates all end users or affected end users, allowing for constantly changing characters, environments and objects at the cloud level. In an embodiment, the system can enable a mixture of pre rendered pictures overlaid onto content that is rendered on the user's device enabling further multithreading of processes and a richer more detailed experience for the user.

In an embodiment, the resource server cloud 260 is configured to anticipate the needs of user terminals 160 through heuristic algorithms or other AI technology. In this embodiment the delay between a user terminal 160 requesting a resource and the resource server cloud 260 providing the requested resource is reduced by having some resources including, inter alia, pre-rendered images available before the actual time of request.

System Elements

The following material discusses various illustrative embodiments of various system elements described in more general terms above. The embodiments described below are intended to be illustrative, not limiting, and other implementations are possible, as will be readily apparent to those skilled in the art.

Player Gamer Profile

Figure 5:
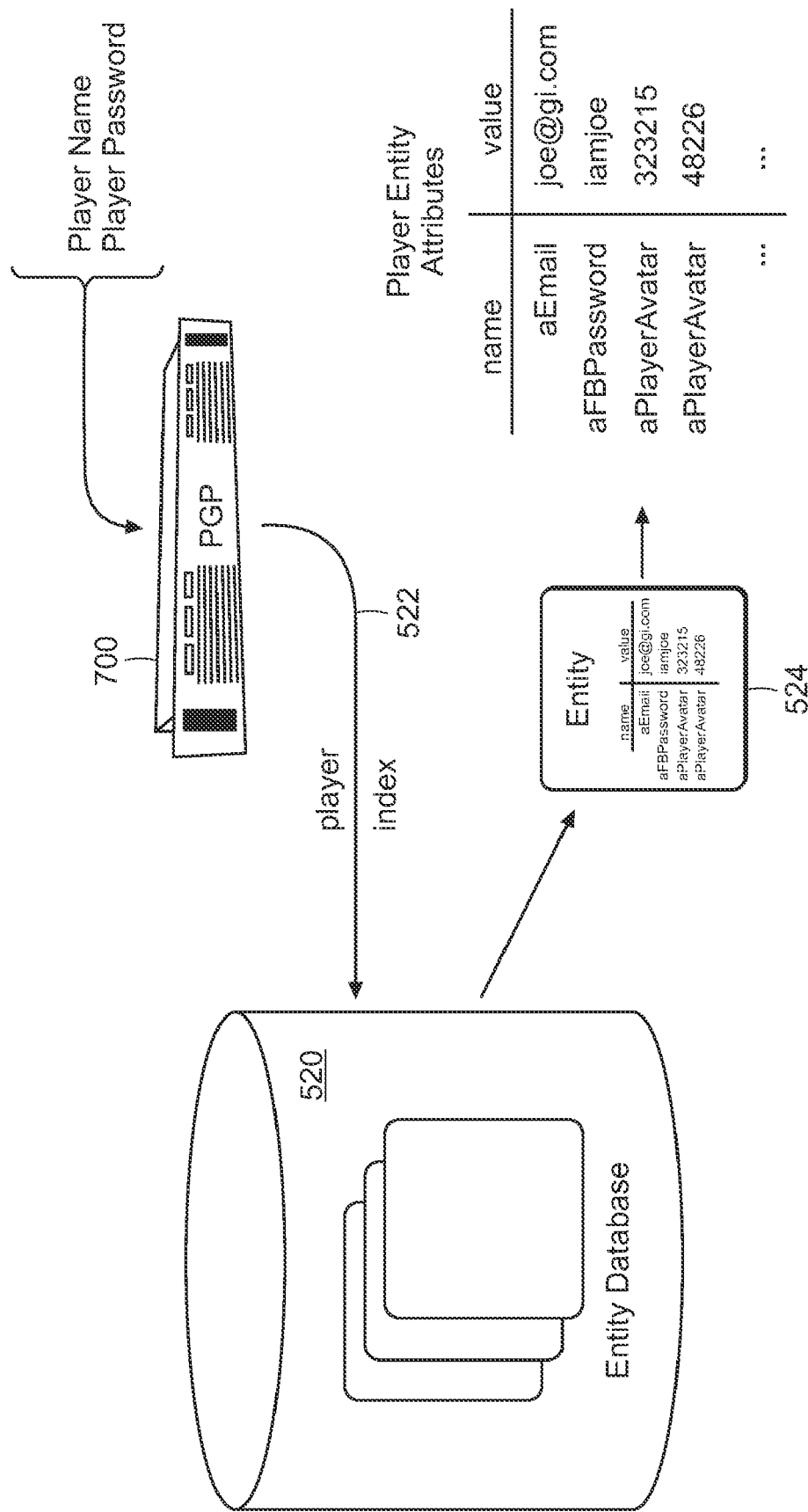
FIG. 5. illustrates how a player gamer profile can be linked, via a player index, to player entities in an entity database.

In an embodiment, at least one player game profile is stored for each user who registers with the Online experience. The player game profile can contain information typically associated with profiles in online services. Such information would at least include a login ID and password. FIG. 5. illustrates how a player gamer profile 700 can be linked, via a player index, 522, to player entities 524 in an entity database 520 stored on, in an embodiment, cloud-based storage. A player entity 524 can contain various types of information, such the users name, address and other demographic information.

An avatar entity 524 could also include information relating to user social networks, for example, the user's Facebook login information, or a combination of social network data. Such information could be used to connect and exchange information with such social networks. Alternatively, or additionally, such information could be used by a login process supported by the Online experience to allow a user to login to the system through an existing session in a social network, or vice-versa (e.g., a user could sign in to Facebook, then transfer to the Online experience).

Figure 6:
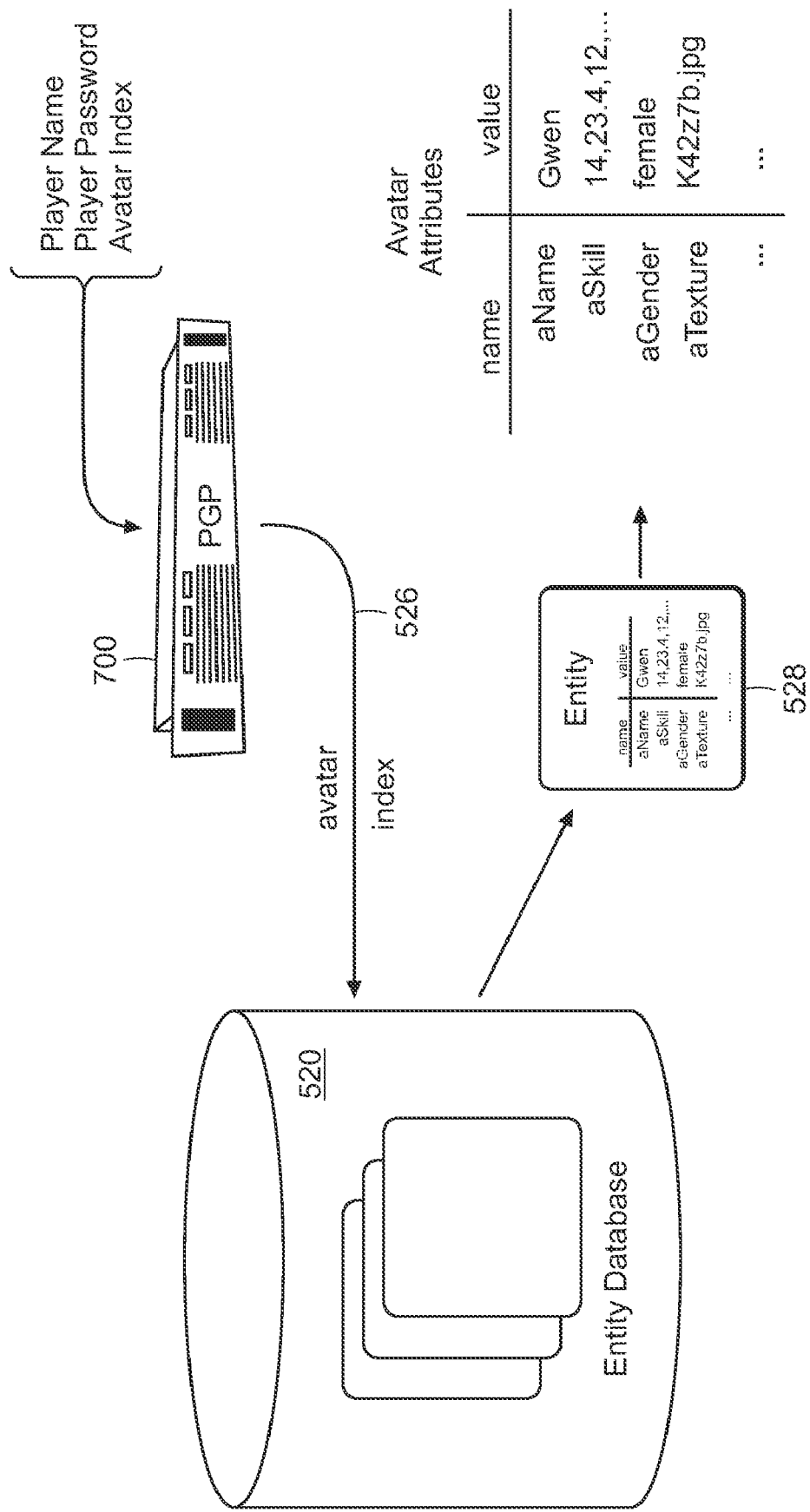
FIG. 6. illustrates how a player gamer profile can be linked, via an avatar index, to avatar entities in an entity database stored on, in an embodiment, cloud-based storage

FIG. 6. illustrates how a player gamer profile 700 can be linked, via an avatar index, 526, to avatar entities 528 in an entity database 528 stored on, in an embodiment, cloud-based storage. An avatar entity 528 can contain various types of information about avatars, such the avatar's name, gender, skills, and experience.

In an embodiment, an entity is stored as an unordered set of attribute name and attribute value triples. Each triple, contains an entity, an attribute identification number and an attribute value string. Every registered attribute name, along with its data definition, is contained at the attribute identification number's index into an attribute definition database. The attribute definition database contains triples of integer pairs together with strings. The numbers can be hard-coded data types, and the character strings are the attribute values.

In an embodiment, when a user logs into the Online experience via the environment's login service, the service sends a player name and password to PGP (Player Gamer Profile). If the password is correct for a given Player Name then the cloud responds with the contents of an Entity associated with that player. All access to the Entity Database logically flow through PGP. The player's Name and Password are required for all access to the Entity Database. Access to both entities and attributes can be further restricted by individual access rights attached to entities and attributes.

The Development Environment

Figure 7:
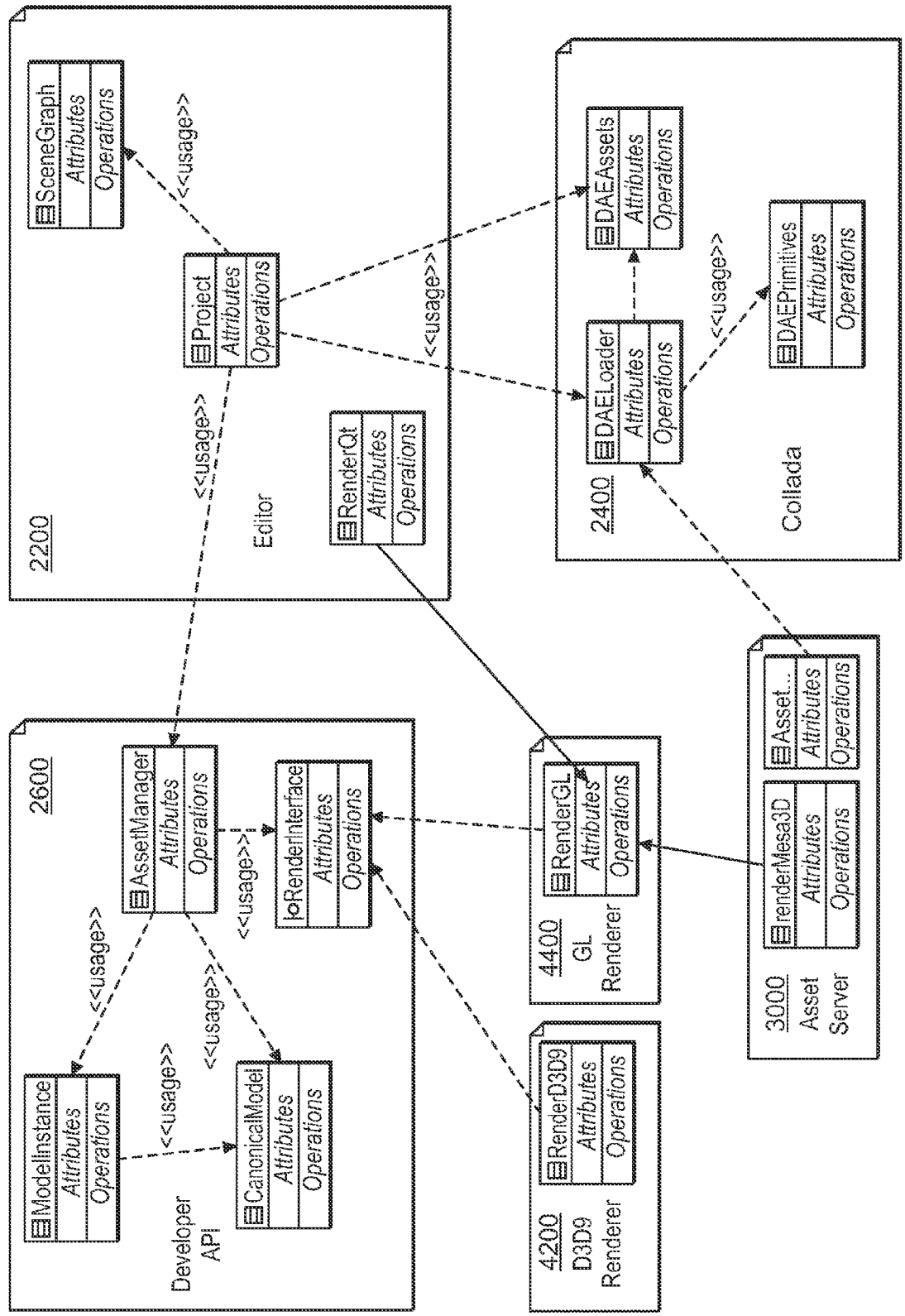
FIG. 7 illustrates one view of the relationship between various components of an embodiment of an MMO development environment.

FIG. 7 illustrates one view of a possible relationship between various components of an embodiment of an Online environment provided by the present systems and methods. There are many different software and hardware renders, file formats, and other modules that can be substituted by those familiar with the art. The components include:

- a system API 2600, which is the primary API provided to developers (has no hard dependencies)
- a COLLADA library 2400 that provides functions to import COLLADA format XML and functions to transformation the data to various 3D formats (dependent upon client rendering needs)
- a GL Renderer 4200, a base OpenGL renderer,
- a D3D9 Renderer 4400, a base DirectD3D9 renderer.
- an editor 2200 that creates and manages system assets ((depends on: the system API, the COLLADA libraries and the RenderGL renderer)
- an asset Server 3000 that creates and manages assets on the server to be issued to game clients (depends on: the system API, the COLLADA libraries and the RenderGL renderer)

Figure 8:
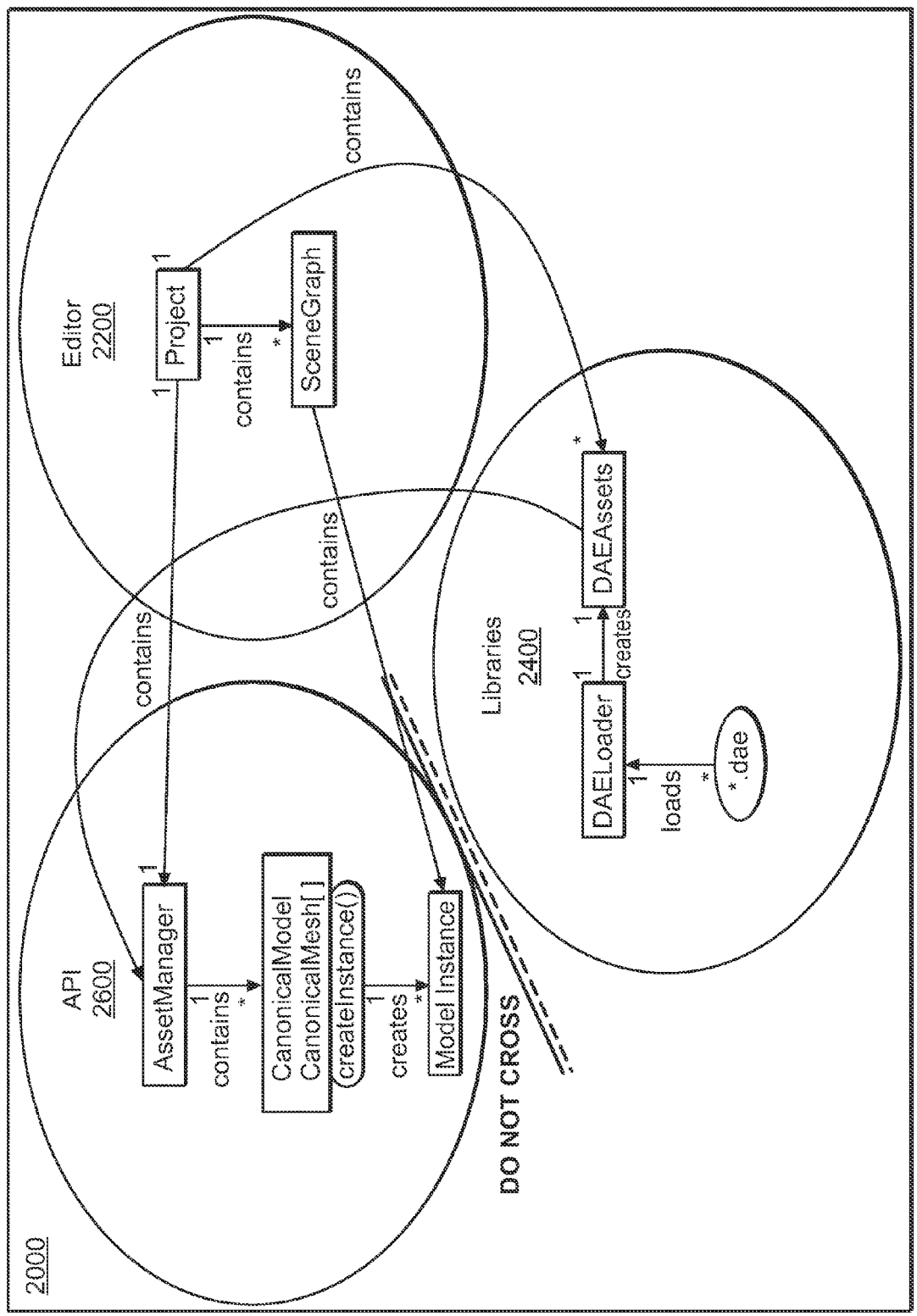
FIG. 8 illustrates another view of the relationship between various components of an embodiment of an MMO development environment.

FIG. 8 illustrates another view of the relationship between various components of an embodiment of an MMO development environment provided by the present systems and methods. The components include:

In an embodiment, developers initially create assets (e.g., such as avatars and avatar associated objects as well as other types of background game content) using industry standard software such as 3D Studio Max, Maya, SoftImage, etc., and export such assets using COLLADA XML format. COLLADA defines an open standard XML schema for exchanging digital assets among various graphics software applications that might otherwise store their assets in incompatible file formats. COLLADA documents that describe digital assets are XML files, usually identified with a .dae (digital asset exchange) filename extension.

Within the development environment 2000, an editor 2200 imports COLLADA XML format files using system libraries 2400 adapted to import such files, and enables manipulation and augmentation of those files. In an embodiment, the editor 2200 enables the developer to see sprite sheets for, for example, avatars, and facilitates the export of that data to the cloud. In an embodiment, data is exported to the cloud using, using functions provided by a system API 2600 that interface with an asset manager. The asset manager stores the data as assets in one or more asset databases using a canonical data model. The import of COLLADA XML files occurs only in the editor 2000, and is isolated from the remainder of the Online experience. In an embodiment, the system additionally allows individual users to manipulate data as a pure data manipulation. The results of such manipulations are sent straight to the cloud.

The System API

In an embodiment, messages between client and front end server are always initiated by the client through the system API. Requests made through the API are reformatted and sent to the server. The server responds to the API message and also sends the address of a server. The address returned is either to itself, if the server wishes to keep the client, or to another server, should the server wish to shed the client. Any server is capable of handling any request equivalently, although there may be time advantages to clients using the "correct" server. At any particular time the client knows about two or three servers:

server with a static IP address in Availability Zone "A"
   server with a static IP address in Availability Zone "B"
   server with a dynamic IP address intended as the next server IP (if known).

In one embodiment, there are three of more availability zones.

Server requests are sent directly from the API to a particular cloud server. A minimum of two cloud servers must always be active. These two always-up servers have static IP addresses that are built into the API. The two servers always exist within separate availability zones, and could even be located in separate Regions. The API makes requests of servers through the following logic.

the API initially makes a request of the server currently known to the API (if any).
   failed (or timed-out) requests are sent to one of the two known IP addresses.
   requests that fail (or time-out) are directed to the other known IP address.
   should failure (or time-out) still occur, then the API reports a failure back to the game.

Cloud servers are each independent, although all share data every few seconds through a common file that logs statistics and is written to by a logging thread on each server. In an embodiment, load balancing decisions can be made independently by each server with regard to periodically shedding the server's load that could be better served by a server less busy or running in a different Availability Zone. Servers that see too little activity over a period of time will shed their entire load and shut down. When a server shedding load cannot identify an underutilized candidate server then that server shedding load will spawn a new server instance in the most needed Availability Zone, subject to capacity limits managed by supervisory functions within the Online experience.

All front-end servers are capable of responding to any request sent from any API client. Internal load balancing permits each server to either shed a portion of its user load to another server or accept user load from another server without the need for an independent load balancer.

Rendering

Figure 9:
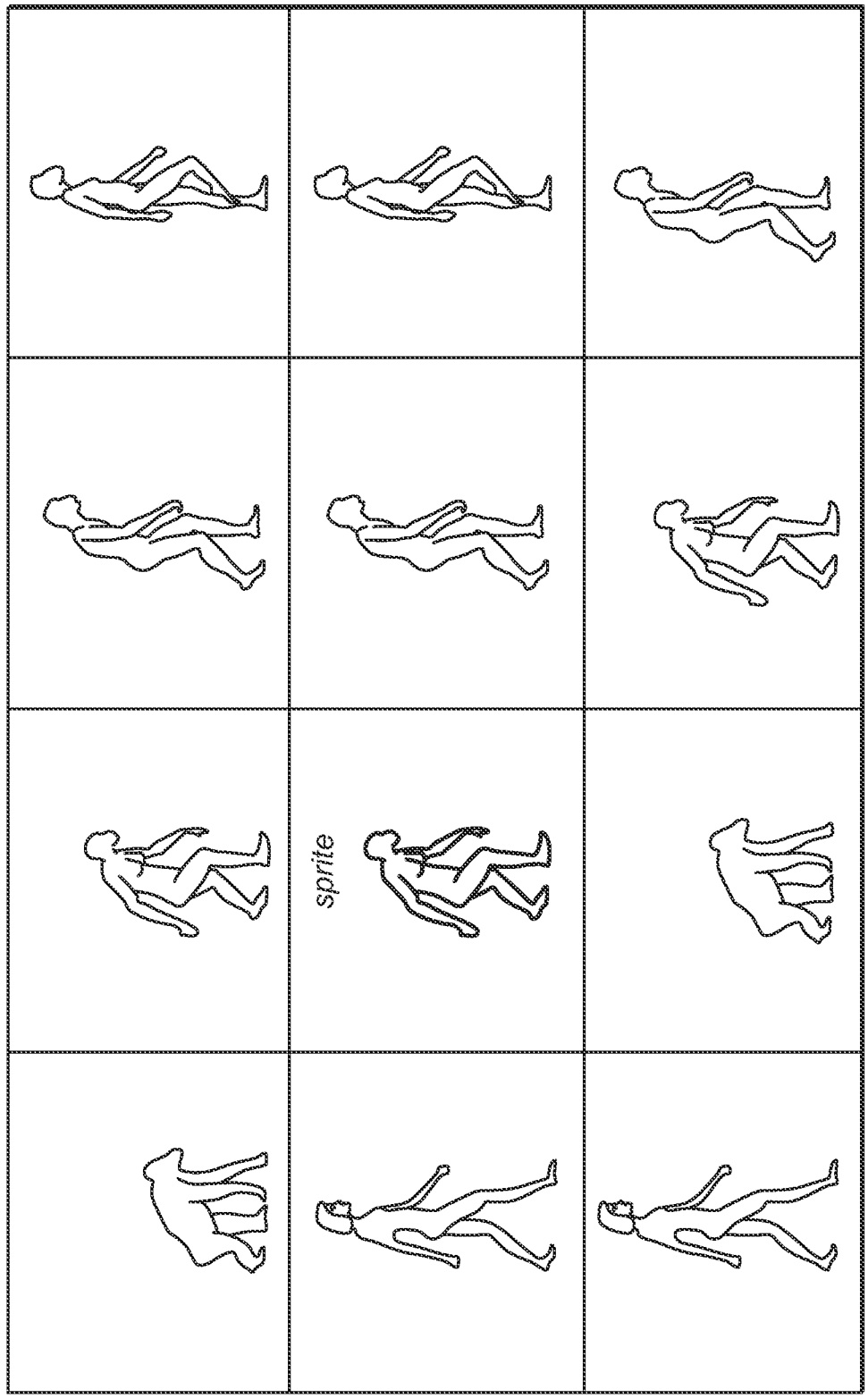
FIG. 9 illustrates a conceptual view of a sprite sheet.

Online games, environments and applications typically include a great deal of content. Such content can include, without limitation, avatars, NPCs, objects owned by avatars or NPCs, backgrounds and environmental objects (e.g. trees). Such content image can be rendered exclusively on the cloud, exclusively on a client, or any combination thereof. For example, a person can take a movie and send the images of that movie at 15 frames a second online so that the end user can view those 15 frames of images as a movie. The present system provides facilities that can break up the actual components of those 15 frames, and through partial rendering of those images on the client device and on servers within the cloud, the computational needs are divided between server and client to more effectively utilize computational resources, and network bandwidth. Such animations could be stored in a sprite sheet such as that shown in FIG. 9.

In an embodiment, if an engine hosted on client devices provides 3D animation, then 3D meshes and animations can exported from storage on the cloud to the runtime environment on the client. On the other hand, if the client is not capable of efficiently processing full 3D, then a partial rendering can performed on a cloud-based server, and stored in cloud-based storage. Such a partial rendering can be reflected in a sprite sheet such as that shown in FIG. 10, which can be transported to the client for final rendering on demand. FIG. 11 illustrates an embodiment of an algorithm for rendering such a sprite sheet on a cloud-based server.

The Development Editor

Figure 3:
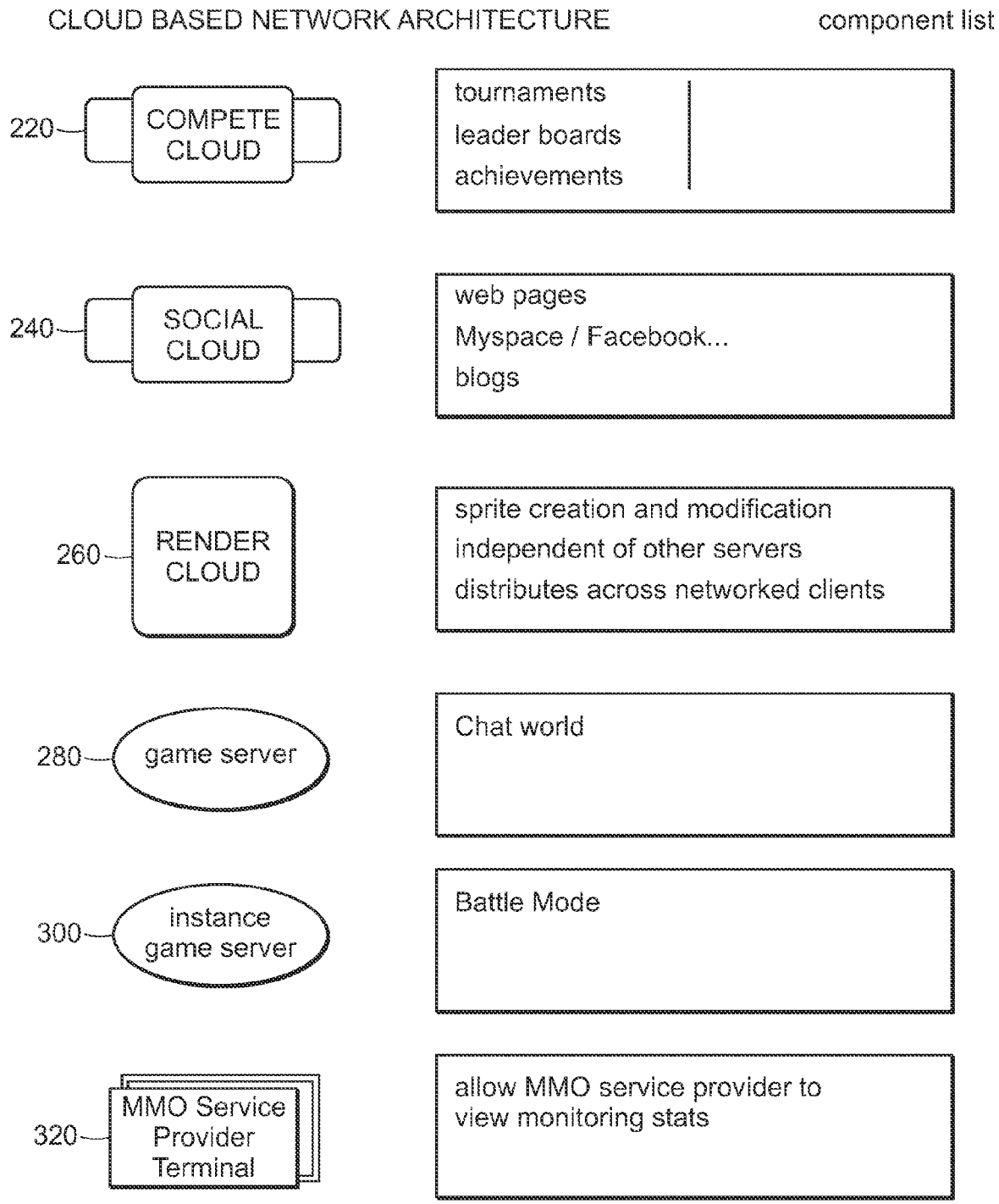
FIG. 3 illustrate the components of the system is shown in FIG. 1 in more detail.
Figure 12:
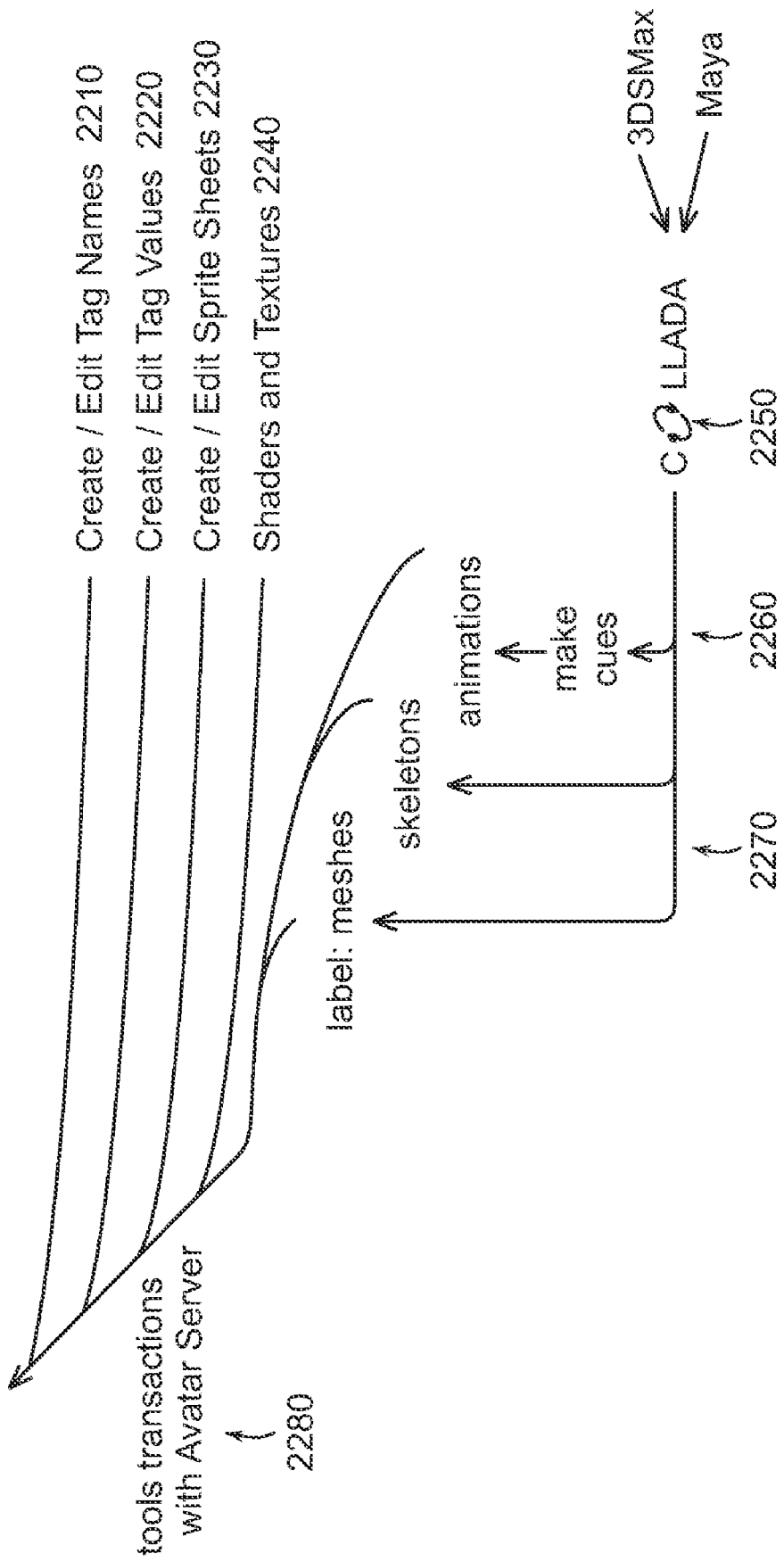
FIG. 12 illustrates an embodiment of an editor toolset.

In an embodiment, all data can be initially placed onto storage accessible to the resource server cloud (e.g. FIGS. 1 and 3, 160). In an embodiment, within the resource server cloud, the editor is supported by an avatar server within the resource server cloud, by using an editor toolset such as that illustrated in FIG. 12. The toolset can provide a variety of editing and uploading functions for the different types of data. The toolset can include functions for creating and editing attribute names 2210, creating and editing attribute values 2220, creating and editing sprite sheets 2230, shaders and texture support 2240, import of COLLADA format XML files 2250, editing of animations and cues 2260 and editing of skeletons and meshes 2270. All tool transactions communicate 2280 with an avatar server.

The following is a non-exclusive list of editable items that can be modified by the editor tool set.

Attribute Names

Each attribute name is a character string with a fixed maximum length. Attribute names are either predefined by the tool set provider or defined by the game developer. Examples of predefined attribute names could include:

aMonetaryValue
   aArmorClass
   aDamageModifier
   aColorVariation
   aMass

Attribute Values

In an embodiment, attribute values, like attribute names, are merely character strings. The maximum length of an attribute value could be significantly longer than the maximum length of an attribute name. This fixed maximum length for an attribute value could determined when an attribute name is created. Attribute values could be arbitrarily formatted. Alternatively, the format for all predefined attribute values could be strictly defined. Each attribute can be marked as writable, if it contains data that games may modify at runtime. Examples of attribute values could include:

"3.25"
   "5/3/4/7"
   "my value"

Sprite Sheets

In an embodiment, the Avatar Server pre-renders characters and deliver those renders to games (client) as sprites. The editor toolset can be used to define sprite sheets.

Figure 13:
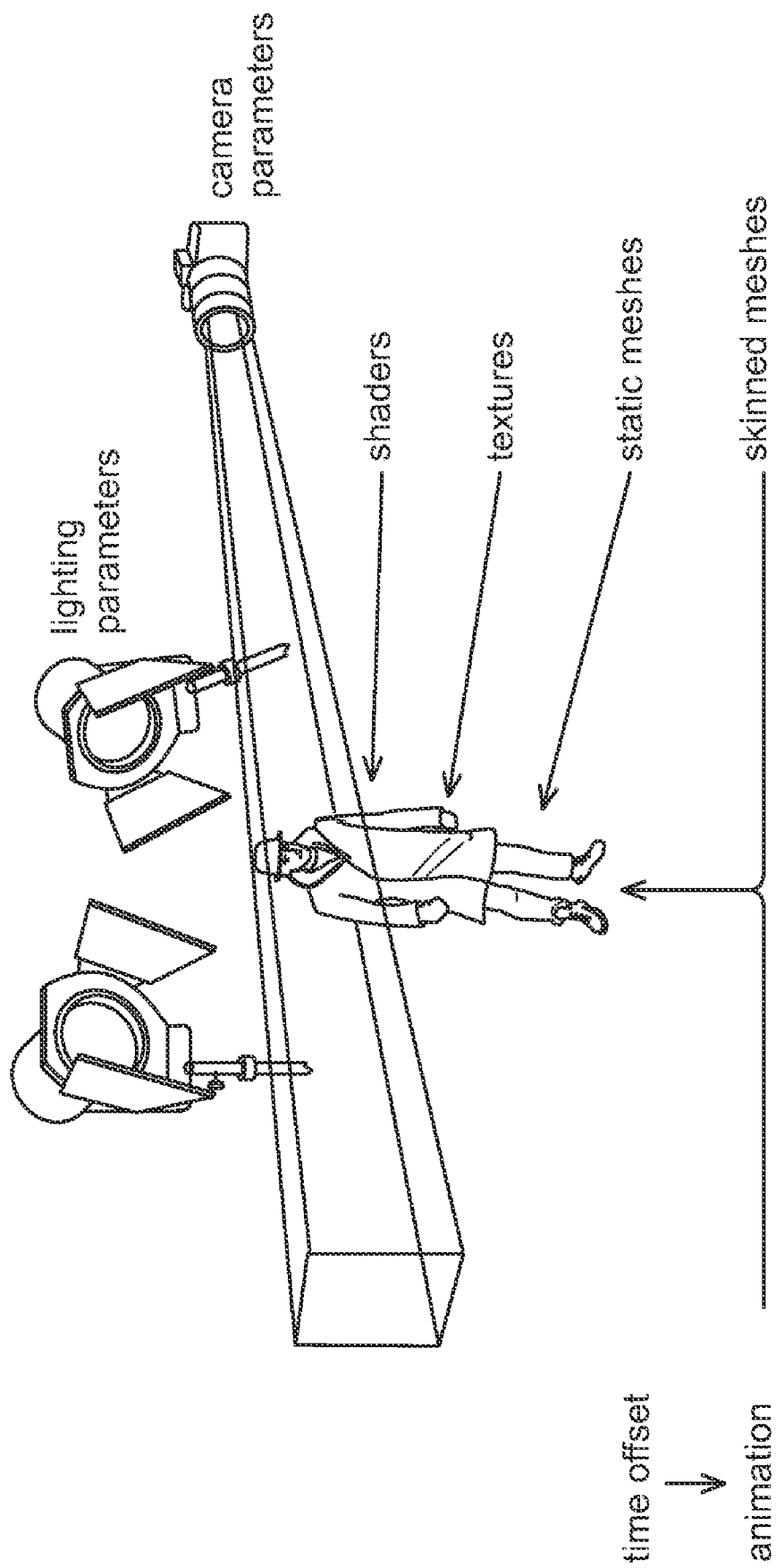
FIG. 13 illustrates various parameters can be taken into account when rendering a sprite.

In an embodiment, the tool creates a developer-specified number of rows and columns, and associates each individual cell with the data necessary for rendering that sprite. Each sprite can be partially or wholly defined in the tool. FIG. 13 illustrates various parameters can be taken into account when rendering a sprite. The rendering of a single sprite can be defined by an extensive set of parameters:

the skeleton, the mesh, and skinning weights
   the full skeleton's or partial skeleton's animation(s) and blending
   time offset into each animation
   shaders
   shader parameters
   textures
   any static meshes
   camera parameters
   lighting parameters
   2D sprite origin Sprite render parameters can be entirely assigned by the developer in the Avatar creation tool. Alternatively, some parameters can be left undefined and the definition of those parameters can be delayed until the application is running. Any sprite render-data which is not wholly defined by the avatar creation tool can be determined at run-time. For example, the application developer may know everything about a character at development time other than the clothes that the character is wearing. FIG. 14 illustrates one example of a partial render.

Shaders and Textures

Shaders enable the flexibility of the final image to have a more realistic, cartoony or filtered effect. They also provide AltEgo developers with easy customization of objects without remodelling the 3D geometry.

Meshes

Each mesh has a variety of data on each vertex, depending upon need. The vertex data always includes position and may optionally include:
- one or more texture coordinates (each vertex has the same number of texture coordinates)
- vertex color
- bone weights
- vertex normal, including the possibility of normals per vertex per face The actual data in the meshes is custom delivered depending on the needs of the platform. Meshes are either skinned (associated with a skeleton) or static. Skinned meshes include the necessary skeleton and the skinning weights and/or matrices. Static meshes can be applied directly to a single bone of a skeleton, or are rooted at the origin when used without a skeleton.

Animations

Each animation identifies the skeleton onto which it applies. Animations can either be full-skeleton in which case every bone is influenced, or they can be partial-skeleton applying only to a single subtree of the overall skeleton, leaving the rest of the skeleton undefined. Partial-skeleton animation can be useful for separating different parts of the body, such as moving the character's legs independently of the character's head. It is possible to also have partial skeletal data.

Animation blending allows various simultaneous animations to play and blend the results. Animations can be marked as looping, meaning that the animation continues to play over and over as the time offset increases; or, non-looping, meaning that any time offsets beyond the end of the animation always yield the final pose of the animation.

Data compression on animations can be reconstituted on the server or the client, or any efficient combination of server and client, depending on computing efficiency.

Time Slider

The editor can provide a visual timeline to support animations. FIG. 15 illustrates an embodiment of a time slider. The time slider can support various functions including:
- a timeline that graphically shows the position in the animation relative to the animation's length
- a time indicator that numerically displays the position in the animation and the animation's length
- cameras and lights can be attached to a skeletal bone or are placed at a fixed position and orientation
- free positioning of the preview camera in the editor
- play looping animations smoothly
- stop at the end of a non-looping animation
- play animations backward or forward, including a "rock" mode for non-looping animation
- "scrubbing" animations by manually dragging a time slider back and forth
- marks on the timeline to define cues attached to the animation
- setting cues on the time slider and associating those cues with cue names.

Avatar SDK

Figure 16:
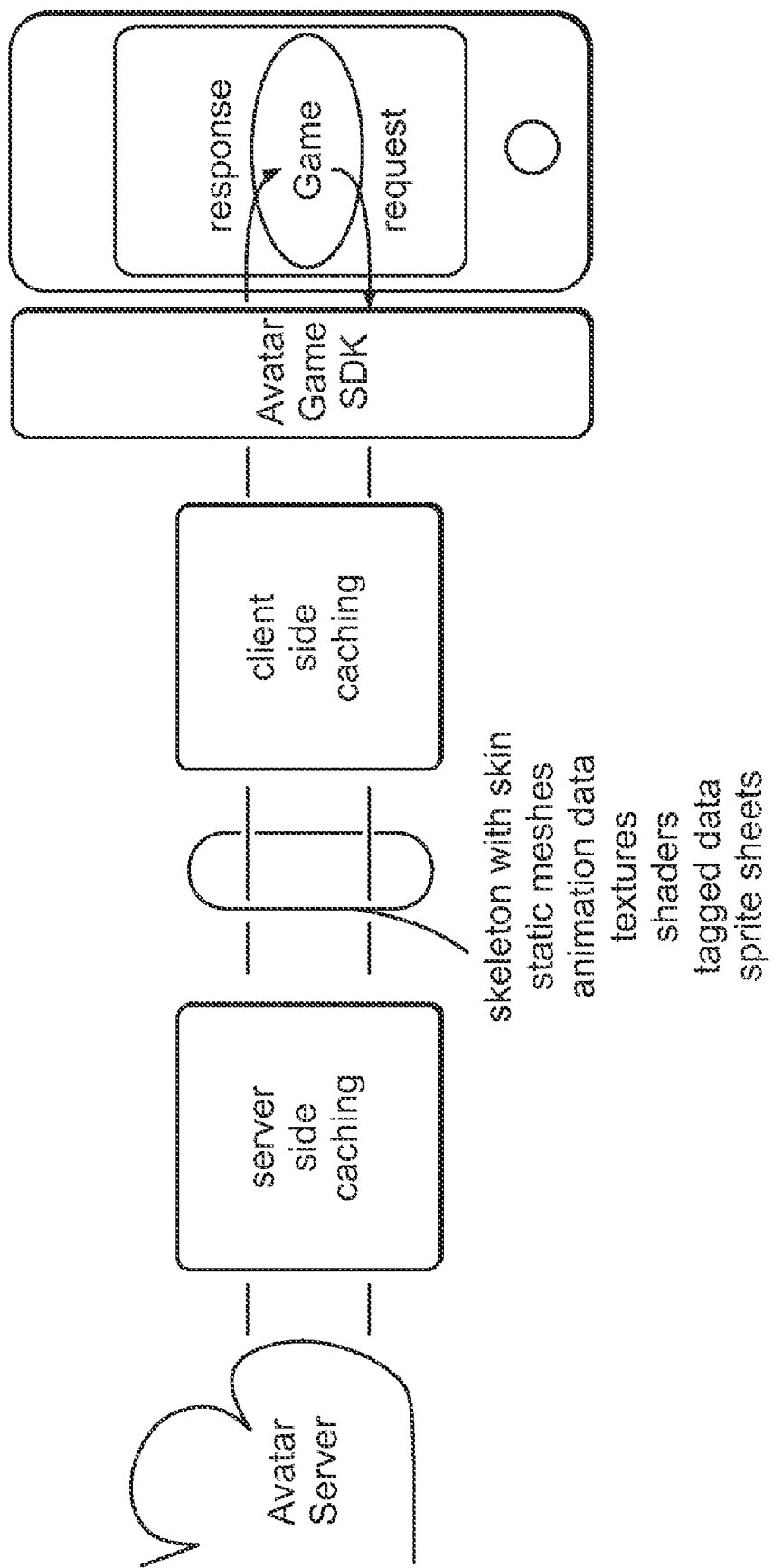
FIG. 16 illustrates the position the SDK occupies within the overall Online experience.

In an embodiment, a developer's online experience accesses avatar related system API functions using an avatar SDK. An online experience makes requests through the SDK, and then responses arrive in the order of the requests FIG. 16 illustrates the position the SDK occupies within the overall Online experience, A response can indicate success, along with response data, or a response can indicate failure and contain no data. Responses from the Avatar server are cached on both the server and client sides. The server side cache is entirely managed by the Online experience. The client side cache has some minimal controls visible to the game through the SDK, including hints for what should or should not be cached. Client side cache can be minimized or emptied at any time by the game explicitly requesting memory. Most requests from the online experience to the Avatar Server will be to retrieve data or render sprite sheets. Data is only written to the server if all of the following occur
- the online experience first requests read/write access to the avatar
- the online experience writes bulk tagged data through the SDK
- all tags being written were marked as writable in the Avatar Editor In an embodiment, the SDK supports the following requests:

| | |
|---|---|
| use a specific avatar | either read privileges or read/write privileges are requested. When read/write is requested writing is still limited to tagged data that is marked as writable. |
| request a sprite sheet | any variables necessary for the request are packaged with the request for a sprite sheet |
| get skeleton with mesh skin | 3D data is sent to the client for rendering |
| get animation | skeletal animation data varying over time |
| get static mesh | 3D data is sent to the client for rendering |
| get texture | a specific texture file is sent to the client |
| get shader | A specific shader program sent to the client |
| get bulk tagged data | may include one or more tags whose values are returned together, along with a server timestamp. missing tags are marked as such. |
| write bulk tagged data | one or more tags are written as a single transaction on the server. failure to write causes no tagged data to be changed |

Currency

The system can be implemented to support a large number of different currencies. In an embodiment, currency can be divided into two distinct currency categories.

"Paper"—one kind of "paper" currency for all games supported by the system

"Coins"—different "coins" currency found in each game supported by the system

In an embodiment, the currencies are all non-transferable between users, and non-convertible between currencies. Once the user possesses a certain currency, be it a specific kind of "coin" or the global "paper", the only way to get rid of that currency is by spending it within a game. In an embodiment, rules can be universally applied to all paper and coins and their purchase. An example set of such rules could specify:

- No transaction purchasing paper or coins may be less than a minimum permitted transaction value (e.g. $5.00).
- All transactions purchasing paper or coins are accounted for by the "territory" (e.g. a group of games, a game or a region or area within an application) in which the purchase occurred and may result in different processing and net yield depending upon accounting rules applied to individual territories.
- A daily dollar spending limit is set globally and applied to each user as a method of fraud prevention.
- Payment systems where the user must provide as little data and interaction as possible per transaction (e.g. one click) is preferred.

In an embodiment, the system can be configured such that transactions occur automatically, with the user's permission for such automatic transactions. (e.g. "you have insufficient paper to complete the current purchase transaction; 100 more paper automatically purchased for $5"). Rules that can be applied to automatic repurchase can include:

- If automatic repurchase is enabled then a user must opt-in to this feature
- Any transaction that fails to repurchase will disable the user's opt-in and present a message to the user.
- Users may separately opt-in for paper and coin automatic repurchase (one selection for each coin type available)
- Automatic disabling due to failed transactions will opt-out the user for automatic repurchase of all currency types.

In an embodiment, the system is configured such that no developer may directly reduce a user's paper: Reduction in paper currency can only occur through actions taken by an enterprise. Mechanisms for the establishment, maintenance, enabling, and disabling of charitable contributions can be established through an enterprise.

Paper Currency

"Paper" currency is the closest thing to real hard currency within an online environment. Paper does not expire, can be held by a user indefinitely and can be used in any enterprise within any environment hosted by the service provider. Paper can only be used to purchase items for sale in an enterprise that are priced in paper. A user's paper may only be reduced by a purchase.

Paper is only purchased using real world money. In an embodiment, transactions by which a user purchases paper can be directed through a service provider's payment clearing provider. The service provider specifies a small selection of paper purchase transactions that are allowed, with each transaction specifying a U.S. dollar cost and the amount of paper offered. The fixed transaction values can established to satisfy a few conditions, for example:

- The ratio of paper purchased to dollars paid increases for purchases priced at increasing dollar values. (e.g. $5->100p $10->250p)

Application developers may opt to give users a certain amount of paper. All such offers can be either enabled or disabled, and application developers may query the service provider server to determine the state of an offer. A service provider may offer developers discounts on purchasing large amounts of paper for this purpose. In an embodiment, each developer giving away paper is assigned a basket of available paper for such distribution. Each purchase of paper that goes into the developer's basket has a minimum transaction amount (e.g. $250.00).

In an embodiment, the amount of paper given to each new user is determined by the developer. Controls over changing the amount of paper given to a new user is not, however, directly controlled by the developer, but rather by the service provider's operations, not the developer. A maximum amount of paper that can be given to a new user can be set that it is relatively small (e.g. $5.00). The system can be configured such that developers have an auto-reauthorization to replenish their basket of paper when it is exhausted. If a developer's basket has insufficient paper to complete a transaction the system can report failure to the user and disable the basket.

When a user purchases an item using paper the developer of the item is credited for a fixed portion of the purchase price in the corresponding territory. In an embodiment, for the purpose of crediting developers for the sale of the developer's paper priced items, the paper to dollars conversion rate can be established using the rate established by the lowest purchase price for paper. Each and every transaction of paper is accounted for with date, time, user, territory, item, authorization # and all other identifying characteristics.

Coins

"Coins" are the more common currency of developer applications. In an embodiment, developer applications can freely give coins to users according to the logic of such applications, but users can also purchase coins for real world money. The pseudo-inflationary act of giving away coins can be offset by the developer providing items available for sale at a continuous spectrum of increasing coin value, without a corresponding increase in special abilities of the purchased items. In an embodiment, the transaction by which a user purchases coins is directed through the service providers payment clearing provider.

In an embodiment, the service providers specify a small selection of coing purchase transactions that are allowed, with each transaction specifying a U.S. dollar cost and the amount of coins offered. The fixed transaction values are established to satisfy a few conditions:

- The developer sets the actual purchase prices for coins but must establish higher rates of coins for more dollars. (e.g. $5->100c $10->250c)
- A developer's application may freely give coins to users.
- Coins sold within a developer's application can only be of the type of coins assigned to that developer's application.
- The service provider can be given the option of selling each and every developer's coin for every application which the user purchasing the coins has visited through enterprises outside of the developer's application.
- All sales of coins to users results in a percentage of the purchase price being credited to the developer in the corresponding territory.

In an embodiment, any user purchase of a coin-valued item through an enterprise hosted by the service provider does not result in any credit to the developer. The coins that were used for purchase were either originally given away by the developer through their application or they were purchased by the user and the developer has already been credited for that purchase.

Coins can be used to purchase both durable and consumable items. In an embodiment, a special mechanism for instant purchase can be provided. An instant purchase allows the developer to sell a consumable item and consume a single count of the consumable item in a single transaction. An instant purchase item can also be available through the applications' store at the exact same coin price of the instant purchase. This adds transparency for the user. Such a special instant purchase mechanism can allow applications to easily implement services that seem to run on coins. (e.g., a ferris wheel ride)

All purchase of coin valued items, including instant purchase, are accounted for just like with paper.

Friend Relationships

In an embodiment, as discussed above, within the application hosting environment disclosed herein, friends are represented as bidirectional links between individual avatars within the context of specific applications. For example, Mary is a friend of Sally in Casino Resort; therefore, also, Sally is a friend of Mary in Casino Resort. There is no preference between the avatars nor is there necessarily any memory of who asked who to become a friend. Friends can cross applications.

In an embodiment, friend relationships originate as copies of friend relationships from the hosting social networks. Two avatars can become friends in an application only if at the time of making friendship they are already friends in a hosting social network or in another game hosted by the service provider. This does not mean that a application-based friend relationship is necessarily present in a hosting social network (e.g. Facebook) but it does mean that the relationship was present at the time that some game friendship began. For example, Rebecca and Sheldon are friends in some game hosted by the service provider; therefore, Rebecca and Sheldon were friends in the Facebook web site, in some other hosting social network, or in some other game hosted by the same provider at the specific time that the AltEgo application friendship began between Rebecca and Sheldon. Consider, for example, the following journal of actions:

Rebecca and Sheldon begin as friends in Facebook

Rebecca begins playing Casino Resort and invites her facebook friend Sheldon with the invitation made through facebook Sheldon accepts Rebecca's request and begins playing Casino Resort as a friend of Rebecca's Rebecca and Sheldon stop being friends in facebook Note that Rebecca and Sheldon are still friends in Casino Resort.

Sheldon begins playing Bridezilla and invites Rebecca with the invitation made through an invitation mechanism. (can't go through Facebook, they are not friends)

Rebecca accepts Sheldon's request and begins playing Bridezilla as a friend of Sheldon's Rebecca stops being Sheldon's friend (or, equivalently, vice versa) in Casino Resort After the journal of transactions is completed Sheldon and Rebecca are friends in the Bridezilla game. They were able to become friends in Bridezilla because they were friends in Casino Resort when they became friends in Bridezilla. The Casino Resort friendship was possible because, at the time it began, they were facebook friends.

In an embodiment, friend suggestions are always derived from the list of all known friends in all contexts, at the time of friend suggestion. The user is in control of which suggestions are acted upon and become friend requests. Friend requests must be affirmatively acknowledged by the second avatar in order to be completed. There is no guarantee that when the friendship is completed that any other friend relationships still exist in any other context.

Multidimensional Experience

User avatars in games typically gain "experience" during the course of game play. Experience traditionally refers to a single non-negative integer that begins at zero and monotonically increases over the duration of a game. The traditional experience system can also be referred to as single-game experience. Various threshold experience values trigger rewards within a game, such as an increase in avatar level. This notion of traditional experience must be preserved by a Multidimensional Experience system.

Multi-application experience is experience collected among multiple games participating in a multi-application experience. Multi-application experience monotonically increases, but it does not necessarily start at zero when an avatar first enters a game. Multi-game experience may increase by actions outside of any individual game due to experience gained in another context.

Multidimensional experience is multi-application experience that is internally represented by a collection of monotonically increasing non-negative values. All avatars are created with zero experience on all axes of the multidimensional space. As an avatar experiences various events (or non-events) within participating applications the multidimensional experience value proceeds away from the origin. An avatar's history over time traces out a wiggly line through the multidimensional experience space.

Two scalar measures of multidimensional experience can be useful. First, the arc-length of the wiggly line measured from the origin to the current point of experience provides a summation of all experience gained across all axes. A second scalar measure of multidimensional experience is the Euclidean distance from the origin. Each application records experience by reporting values associated with actions carried out by the avatar. For example, if the avatar bakes a cake then the game would report the value 1 and the action of baking cake. A limitless number of actions can be recorded, even though the dimensionality of the experience space is finite.

The application developer need not be aware of the underlying implementation of multidimensional experience. Their application merely associates each assignment of experience with an unvarying tersely worded English language textual description of the experience. The description should largely be a subject and a verb along with any absolutely necessary modifiers. A multidimensional experience system automatically converts textual descriptions into directions in the multidimensional space, such that each experience direction has a non-negative projection along each axis. The application can then request either of the two scalar measures of multidimensional experience, or can request the approximate experience associated with a textual description of the experience. In the latter case of requesting a particular experience the value is calculated by projecting the multidimensional experience onto a line through the origin defined by the textual description's direction vector.

The natural language expression can be converted into a direction vector through a variety of means. In an embodiment, each unique word represents a different axis. The collection of words in the natural language expression forms a chain of vectors whose sum produces a vector whose direction represents the expression in multidimensional space. In another embodiment, a small finite set of natural language expressions can be predefined and assigned directions in the multidimensional space to achieve similar directions for similar expressions.

In yet another embodiment, encoding utilizes a large training set of natural language expressions in order to learn the relationship between words by their closeness to other words. The process begins by assigning each root word a different axis.

Simulated annealing and/or other approximations to global optimization are performed iteratively in order to reduce the number of dimensions by moving some word vectors away from their starting axes while attempting to improve upon word vector relationships such that words found close together in the training set are more likely to have similar vector directions than words found far apart in the training set. The collection of words in an expression are then encoded using the methods described above. Alternatively, word phrases up to some small finite length (e.g. 3 words) are used to form the initial axes from the training set as well as to encode an expression or a finite number of word phrases are used where the word phrases chosen are the ones occurring most frequently in the document.

The natural language expression may be converted to a multidimensional vector as a pre-processing step or the expression may be converted to a vector through the API at run-time.

Vector directions are useful for two purposes. First, a vector direction together with a magnitude represents new experience and is combined (e.g., via summing) with historical experience vectors in order to determine the total experience of the avatar. Second, a vector direction can represent a natural language query regarding the player's experience. The query operates on the avatars historical experience (e.g.,: vector multiplying) in order to determine the magnitude of experience that an avatar has with regard to the query expression.

In an embodiment, in the beginning, no avatars have any experience and no textual descriptions of experience exist. Once the system is completely operational a limited number of dimensions are used to express the direction of each textual description. The multidimensional experience system initializes with each axis of the multidimensional space representing a single description of experience. For example, three different textual descriptions of experience could be assigned the directions (1,0,0), (0,1,0), and (0,0,1). In actual practice there will be more than three dimensions.

Particularly in the case where a user plays a number of different applications, an avatar's experience can occupy more descriptions than number of dimensions in the experience-space. In an embodiment, the experience system can consider the relationship between different textual descriptions. These relationships are found by further processing of the description text. In an embodiment, each textual description is de-composed into a set of words, without regard to the order of the words.

For example, the experience phrase "baking bundt cake" is decomposed into the following elements, {baking, bundt, cake}. Another experience phrase, such as "baking angel food cake" is decomposed into, {baking, angel, food, cake}. Perhaps a better way to de-compose the phrase is, {baking, "angel food", cake}. The vector values for these phrases are defined as an unweighted sum of the vector values for each word. So, for the examples above:

$$\text{vector}("baking\ bundt\ cake") = normalizedDirection \begin{pmatrix} \text{vector}("baking") + \\ \text{vector}("bundt") + \\ \text{vector}("cake") \end{pmatrix}$$

$$\text{vector}("baking\ angel\ food\ cake") = normalizedDirection \begin{pmatrix} \text{vector}("baking") + \\ \text{vector}("angel") + \\ \text{vector}("food") + \\ \text{vector}("cake") \end{pmatrix}$$

Thus, the problem of determining a vector for a phrase is reduced to the problem of determining vectors for individual words.

In an embodiment, the vector value for words can be determined in two parts. The first step reduces words into root words, and throws away articles and other uninteresting words. For example, "baking" becomes simply "bake." The second step uses data gathered from crawling the World Wide Web (or, just Wikipedia) and determines the mutual probabilities of finding pairs of words near to each other within the gathered text. The mutual probabilities are used to place each word within the multidimensional space such that words that have a high likelihood of being found near to each other are positioned near to each other in the multidimensional space. The actual meanings of the axes are unimportant and are merely the result of empirical analysis.

The multidimensional experience system can be built through this process. Word phrases can pre-processed by the developer toolset using an underlying database of words. Finally, vectors whose values are hidden from developers, are used to characterize each phrase, and those vectors replace the textual phrase at game run-time.

In an embodiment, a method includes receiving, over a network, data defining an avatar, wherein data defining the avatar is stored to a computer readable medium; creating, using at least one computing device, using the data defining the avatar, a sprite sheet comprising a plurality of sprites, wherein each sprite comprises a partial rendering of the respective avatar and at least one run-time parameter comprising a sprite attribute; receiving, over the network, a plurality of requests for the avatar from a plurality of user applications; and transmitting, over the network, the data defining the avatar and the sprite sheet to each of the requesting games, whereby each respective user application is enabled to display the sprites in the sprite sheet, and wherein the user application is further enabled to set the at least one run-time parameter associated with each of the sprites in the sprite sheet such that each respective sprite is thereby customized to the application.

In an embodiment, a method includes receiving, over a network, from a first user application, data relating to an activity experienced by an avatar in a first user application, wherein the data comprises an avatar identifier, a first activity name and a first activity experience value; extracting, using at least one computing device, at least one first activity term from the first activity name; creating, using at least one computing device, an entry in a multidimensional vector space, wherein each of the at least one first activity terms is used to set a value of at least one dimension of the multidimensional vector space, and first activity experience value is used to set an experience value of the entry; receiving, over a network, from a second user application, a request for avatar experience relating to the activity, wherein the request comprises the avatar identifier and a second activity name, wherein the second activity name is equivalent in meaning to the first activity name; extracting, using at least one computing device, at least one second activity term from the second activity name; locating, using the at least one computing device, the entry in the multidimensional vector space, wherein each of the at least one second activity terms is used to set a value of at least one dimension of the multidimensional vector space, whereby the entry is located; and sending, over the network, to the second user game, the experience value of the entry.

In an embodiment, a method includes receiving, over a network, data from an application relating to a player's experience, wherein the data relating to the player's experience comprises a plurality of phrases in a natural language expression; converting, using a computing device, the plurality of natural language expressions, into a plurality of multidimensional vectors; combining, using the computing device, the plurality of multidimensional vectors such that natural language expressions of related content have a high likelihood of related direction in a multidimensional space defined by the plurality of multidimensional vectors; and storing representations of the data relating to a player's experience in the multidimensional vector space.

In an embodiment, a system includes a first module comprising one or more processors programmed to execute software code retrieved from a computer readable storage medium storing software for receiving, over a network, data defining an avatar, wherein data defining the avatar is stored to a computer readable medium; a second module comprising one or more processors programmed to execute software code retrieved from a computer readable storage medium storing software for creating, using at least one computing device, using the data defining the avatar, a sprite sheet comprising a plurality of sprites, wherein each sprite comprises a partial rendering of the respective avatar and at least one run-time parameter comprising a sprite attribute; a third module comprising one or more processors programmed to execute software code retrieved from a computer readable storage medium storing software for receiving, via the network, a plurality of requests for the avatar from a plurality of user games; a fourth module comprising one or more processors programmed to execute software code retrieved from a computer readable storage medium storing software for transmitting, over the network, the data defining the avatar and the sprite sheet to each of the requesting games, whereby each respective user application is enabled to display the sprites in the sprite sheet, and wherein the user application is further enabled to set at least one run-time parameter associated with each of the sprites in the sprite sheet such that each respective sprite is thereby customized to the game; and a fifth module comprising one or more processors programmed to execute software code retrieved from a computer readable storage medium storing software for transmitting, over the network, 3D meshes and assets associated with the 3D meshes.

In an embodiment, the methods disclosed herein can transform data representing objects in an online environment into graphic objects that may be visually displayed. In an embodiment, the methods disclosed herein can transform data relating to objects in an online environment into experience scores that can effect the display and behavior of graphic representations of such objects. The embodiments described herein may be implemented using any appropriate computer system hardware and/or computer system software. In this regard, those of ordinary skill in the art are well versed in the type of computer hardware that may be used (e.g., a mainframe, a mini-computer, a personal computer ("PC") or other type of consumer electronic device, a network (e.g., an intranet and/or the internet)), the type of computer programming techniques that may be used (e.g., object oriented programming), and the type of computer programming languages that may be used (e.g., C++, Basic, AJAX, Javascript). The aforementioned examples are illustrative and not restrictive. For purposes of this disclosure, a computer or computing device includes a processor and memory for storing and executing program code, data and software which may also be tangibly stored or read from any type or variety of well known computer readable storage media such as magnetic or optical discs, by way of non-limiting example. Computers can be provided with operating systems that allow the execution of software applications in order to manipulate data. Personal computers, personal digital assistants (PDAs), wireless devices, cellular telephones, internet appliances, media players, home theater systems, servers, and media centers are several non-limiting examples of computing devices. The computer or computing device can also include a display, such as a screen or monitor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

All patents, patent applications, and published references cited herein are hereby incorporated by reference in their entirety. It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method comprising:
   inputting, using at least one computing device, a training set of natural language expressions;
   assigning, using the at least one computing device, each root word in each of the natural language expressions, a different axis, wherein each of the root word in each of the natural language expressions are globally optimized to reduce the number of dimensions by moving word vectors away from their starting axes while attempting to improve word vector relationships of words found close together in the training set;

receiving, over a network, data defining an avatar, wherein data defining the avatar is stored to a computer readable medium;

creating, using the at least one computing device, using the data defining the avatar, a sprite sheet comprising a plurality of sprites, wherein each sprite comprises a partial rendering of the respective avatar and at least one run-time parameter comprising a sprite attribute;

receiving, over the network, a plurality of requests for the avatar from a plurality of user applications; and transmitting, over the network, the data defining the avatar and the sprite sheet to each of the requesting user applications, whereby each respective user application is enabled to display the sprites in the sprite sheet, and wherein the user application is further enabled to set the at least one run-time parameter associated with each of the sprites in the sprite sheet such that each respective sprite is thereby customized to the application.

2. The method of claim 1 further comprising transmitting, over the network, at least one 3D mesh and assets associated with the avatar.

3. The method of claim 2 wherein the assets associated with the at least one 3D mesh comprise at least one type of data selected from the group consisting of texture, skeleton, and bones.

4. The method of claim 2 wherein the at least one computing device is a consumer electronics device.

5. The method of claim 4 wherein the at least one 3D mesh and assets associated with the at least one 3D mesh are specifically formatted for the consumer electronics device.

6. The method of claim 1 further comprising:
receiving, over a network, the data defining the avatar from at least one of the requesting applications, wherein the at least one of the requesting applications has modified at least one element of the data defining the avatar; and
updating, on the computer readable medium, using the data defining the avatar.

7. The method of claim 6 wherein the at least one element of the data defining the avatar relates to application experience.

8. The method of claim 6 wherein the at least one element of the data defining the avatar relates to at least one application object possessed by the avatar.

9. The method of claim 8 wherein the at least one element of the data defining the avatar is a link to an application object having application object data, the application object data being stored on the computer readable medium separately from the data defining the avatar.

10. The method of claim 9 wherein the entry in a multidimensional vector space existed before the data relating to an activity experienced by an avatar in a first user application is received, wherein the experience value of the entry is increased by an amount proportional to the first activity experience value.

11. The method of claim 6 wherein the at least one element of the data defining the avatar relates to at least a second avatar that is defined as a friend of the avatar.

12. The method of claim 6 wherein the at least one element of the data defining the avatar relates to currency possessed by the avatar.

13. A method comprising:
inputting, using at least one computing device, a training set of natural language expressions;
assigning, using the at least one computing device, each root word in each of the natural language expressions, a different axis, wherein each of the root word in each of the natural language expressions are globally optimized to reduce the number of dimensions by moving word vectors away from their starting axes while attempting to improve word vector relationships of words found close together in the training set;
receiving, over a network, from a first user application, data relating to an activity experienced by an avatar in a first user application, wherein the data comprises an avatar identifier, a first activity name and a first activity experience value;
extracting, using the at least one computing device, at least one first activity term from the first activity name;
creating, using at least one computing device, an entry in a multidimensional vector space, wherein each of the at least one first activity terms is used to set a value of at least one dimension of the multidimensional vector space, and first activity experience value is used to set an experience value of the entry;
receiving, over a network, from a second user application, a request for an avatar experience value relating to the activity, wherein the request comprises the avatar identifier and a second activity name;
extracting, using at least one computing device, at least one second activity term from the second activity name;
locating, using the at least one computing device, the entry in the multidimensional vector space, wherein each of the at least one second activity terms is used to set a value of at least one dimension of the multidimensional vector space, whereby the entry is located; and
sending, over the network, to the second user application, the experience value of the entry.

14. A method comprising:
inputting, using a computing device, a training set of natural language expressions;
assigning, using the computing device, each root word in each of the natural language expressions, a different axis, wherein each of the root word in each of the natural language expressions are globally optimized to reduce the number of dimensions by moving word vectors away from their starting axes while attempting to improve word vector relationships of words found close together in the training set;
receiving, over a network, data values from an application relating to a user's experience using the application, wherein the data values relating to the user's experience using the application comprise a plurality of phrases in a natural language expression;
converting, using the computing device, the plurality of natural language expressions, into a plurality of multidimensional vectors;
combining, using the computing device, the plurality of multidimensional vectors such that natural language expressions of related content have a related direction in a multidimensional space defined by the plurality of multidimensional vectors; and
storing representations of the data values relating to the user's experience using the application in the multidimensional vector space.

15. The method of claim 14 further comprising:
receiving, over a network, a natural language query from an application for the user's experience with respect to the subject matter of the query;
converting, using a computing device, the natural language query into at least one multidimensional vector;

combining, using the computing device, the at least one multidimensional vector;

locating, using the computing device; the combined at least one multidimensional vector within the multidimensional space; and transmitting, over the network, the representation of the player's experience associated with the combined at least one multidimensional vector to the application.

16. The method of claim 14 wherein each root word in a natural language expression represents a different axis of the multidimensional vector space, wherein the collection of words in the natural language expression forms a chain of vectors whose sum produces a vector whose direction represents the expression in the multidimensional space.

17. The method of claim 14 wherein a plurality of natural language expressions are predefined and are each assigned directions in the multidimensional space, such that similar expressions have similar directions.

18. A system comprising:

a first module comprising one or more processors programmed to execute software code retrieved from a computer readable storage medium storing software for receiving, over a network, data defining an avatar, wherein data defining the avatar is stored to a computer readable medium;

a second module comprising one or more processors programmed to execute software code retrieved from a computer readable storage medium storing software for creating, using at least one computing device, using the data defining the avatar, a sprite sheet comprising a plurality of sprites, wherein each sprite comprises a partial rendering of the respective avatar and at least one run-time parameter comprising a sprite attribute;

a third module comprising one or more processors programmed to execute software code retrieved from a computer readable storage medium storing software for receiving, via the network, a plurality of requests for the avatar from a plurality of user applications;

a fourth module comprising one or more processors programmed to execute software code retrieved from a computer readable storage medium storing software for transmitting, over the network, the data defining the avatar and the sprite sheet to each of the requesting user applications, whereby each respective user application is enabled to display the sprites in the sprite sheet, and wherein the user application is further enabled to set at least one run-time parameter associated with each of the sprites in the sprite sheet such that each respective sprite is thereby customized to the game;

a fifth module comprising one or more processors programmed to execute software code retrieved from a computer readable storage medium storing software for transmitting, over the network, 3D meshes and assets associated with the 3D meshes;

a sixth module comprising one or more processors programmed to execute software code retrieved from a computer readable storage medium storing software for inputting, using at least one computing device, a training set of natural language expressions; and a seventh module comprising one or more processors programmed to execute software code retrieved from a computer readable storage medium storing software for assigning each root word in each of the natural language expressions, a different axis, wherein each of the root word in each of the natural language expressions are globally optimized to reduce the number of dimensions by moving word vectors away from their starting axes while attempting to improve word vector relationships of words found close together in the training set.

* * * * *

UNITED STATES PATENT AND TRADEMARK OFFICE
CERTIFICATE OF CORRECTION

Page 1 of 1

PATENT NO. : 8,151,199 B2
APPLICATION NO. : 12/703055
DATED : April 3, 2012
INVENTOR(S) : Seth R. Gerson, Philip D. Harvey and Susan E. Thayer It is certified that error appears in the above-identified patent and that said Letters Patent is hereby corrected as shown below:

In the Specifications:

Col. 1, Ln. 6, Delete "61/151,032"
　　　　　　　Insert --61/151,022--

Signed and Sealed this
Fifteenth Day of May, 2012

David J. Kappos
*Director of the United States Patent and Trademark Office*